US012313756B2

(12) United States Patent
Dutta et al.

(10) Patent No.: US 12,313,756 B2
(45) Date of Patent: May 27, 2025

(54) TECHNIQUES FOR ESTABLISHING DIRECTIONAL COMMUNICATIONS VIA A CONFIGURABLE REFLECTIVE SURFACE

(71) Applicant: QUALCOMM INCORPORATED, San Diego, CA (US)

(72) Inventors: Sourjya Dutta, San Diego, CA (US); Junyi Li, Fairless Hills, PA (US); Kapil Gulati, Belle Mead, NJ (US); Navid Abedini, Basking Ridge, NJ (US); Shuanshuan Wu, San Diego, CA (US); Anantharaman Balasubramanian, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 17/453,810

(22) Filed: Nov. 5, 2021

(65) Prior Publication Data

US 2023/0144085 A1 May 11, 2023

(51) Int. Cl.
*G01S 3/14* (2006.01)
*H04W 16/28* (2009.01)

(52) U.S. Cl.
CPC .............. *G01S 3/14* (2013.01); *H04W 16/28* (2013.01)

(58) Field of Classification Search
CPC ...... G01S 3/14; H04W 16/28; H04B 7/04013; H04B 7/0617
See application file for complete search history.

(56) References Cited

U.S. PATENT DOCUMENTS

2023/0327714 A1\* 10/2023 Baligh .................. H04B 7/088
375/262

OTHER PUBLICATIONS

An J., et al., "Joint Training of the Superimposed Direct and Reflected Links in Reconfigurable Intelligent Surface Assisted Multiuser Communications", arxiv.org, Cornell University Library, 201 Olin Library Cornell University Ithaca, NY 14853, May 30, 2021, 45 Pages, XP081971953, Section III, pp. 6-9, Figure 2 Section IV, pp. 12-14, Figure 3.

(Continued)

*Primary Examiner* — Ankur Jain
(74) *Attorney, Agent, or Firm* — Holland & Hart LLP/Qualcomm

(57) ABSTRACT

This disclosure provides systems, methods and apparatus, including computer programs encoded on computer storage media, for establishing directional communications between two communication nodes via a configurable reflective surface. In some aspects, an assisting node (AN) may control a reflection characteristic (which may dictate or influence how signals reflect off of the configurable reflective surface) in accordance with parameters or configurations for directional communication between the two communication nodes. For example, the AN may use a first beam for directional communication with the first node and a second beam for directional communication with the second node, and the AN may control the reflection characteristic in accordance with an inferred incident direction of signaling at the configurable reflective surface and a desired reflected direction of the signaling from the configurable reflective surface that are associated with the first beam and the second beam, respectively.

30 Claims, 13 Drawing Sheets

(56) References Cited

OTHER PUBLICATIONS

International Search Report and Written Opinion—PCT/US2022/045925—ISA/EPO—Mar. 14, 2023.
Ning B., et al., "Channel Estimation and Hybrid Beamforming for Reconfigurable Intelligent Surfaces Assisted THz Communications", arxiv.org, Cornell University Library, 201 Olin Library Cornell University Ithaca, NY 14853, Dec. 25, 2019, 16 Pages, XP081566211, Sections II and III, p. 3-p. 6, figures 2-8.
Partial International Search Report—PCT/US2022/045925—ISA/EPO—Jan. 4, 2023.

* cited by examiner

TECHNIQUES FOR ESTABLISHING DIRECTIONAL COMMUNICATIONS VIA A CONFIGURABLE REFLECTIVE SURFACE

TECHNICAL FIELD

This disclosure relates to wireless communications, including techniques for establishing directional communications via a configurable reflective surface.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at an assisting node (AN). The method may include communicating with a first node in accordance with a parameter for directional reception of signals from the first node, communicating with a second node in accordance with a parameter for directional transmission of signals to the second node, and controlling a reflection characteristic of a configurable reflective surface in accordance with the parameter for directional reception of signals from the first node and the parameter for directional transmission of signals to the second node.

Another innovative aspect of the subject matter described in this disclosure can be implemented in an apparatus for wireless communications at an assisting node (AN). The apparatus may include a first interface, a second interface, and a processing system. The first interface may be configured to communicate with a first node in accordance with a parameter for directional reception of signals from the first node and communicate with a second node in accordance with a parameter for directional transmission of signals to the second node. The first interface, the second interface, or the processing system may be configured to control a reflection characteristic of a configurable reflective surface in accordance with the parameter for directional reception of signals from the first node and the parameter for directional transmission of signals to the second node.

Another innovative aspect of the subject matter described in this disclosure can be implemented in an apparatus for wireless communications at an assisting node (AN). The apparatus may include a processor, memory coupled with the processor, and instructions stored in the memory. The instructions may be executable by the processor to cause the apparatus to communicate with a first node in accordance with a parameter for directional reception of signals from the first node, communicate with a second node in accordance with a parameter for directional transmission of signals to the second node, and control a reflection characteristic of a configurable reflective surface in accordance with the parameter for directional reception of signals from the first node and the parameter for directional transmission of signals to the second node.

Another innovative aspect of the subject matter described in this disclosure can be implemented in another apparatus for wireless communications at an assisting node (AN). The apparatus may include means for communicating with a first node in accordance with a parameter for directional reception of signals from the first node, means for communicating with a second node in accordance with a parameter for directional transmission of signals to the second node, and means for controlling a reflection characteristic of a configurable reflective surface in accordance with the parameter for directional reception of signals from the first node and the parameter for directional transmission of signals to the second node.

Another innovative aspect of the subject matter described in this disclosure can be implemented in a non-transitory computer-readable medium storing code for wireless communications at an assisting node (AN). The code may include instructions executable by a processor to communicate with a first node in accordance with a parameter for directional reception of signals from the first node, communicate with a second node in accordance with a parameter for directional transmission of signals to the second node, and control a reflection characteristic of a configurable reflective surface in accordance with the parameter for directional reception of signals from the first node and the parameter for directional transmission of signals to the second node.

In some implementations of the method, apparatuses, and non-transitory computer-readable medium described herein, controlling the reflection characteristic of the configurable reflective surface may include operations, features, means, or instructions for controlling, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

In some implementations of the method, apparatuses, and non-transitory computer-readable medium described herein, controlling the reflection characteristic of the configurable reflective surface may include operations, features, means, or instructions for controlling, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

One innovative aspect of the subject matter described in this disclosure can be implemented in a method for wireless communications at an assisting node (AN). The method may include receiving an indication of resources for training communications via a configurable reflective surface, the resources associated with training occasions, where each training occasion includes a set of multiple sub-occasions and where each sub-occasion includes a set of multiple measurement occasions, controlling, during a training occasion, the configurable reflective surface in accordance with a respective reflection parameter value of a set of multiple reflection parameter values for each measurement occasion of the set of multiple measurement occasions associated with the respective training occasion, receiving, from a first node, an indication of one of the set of multiple reflection parameter values, and controlling, for communications between the first node and a second node, the configurable reflective surface in accordance with the indicated one of the set of multiple reflection parameter values.

Another innovative aspect of the subject matter described in this disclosure can be implemented in an apparatus for wireless communications at an assisting node (AN). The apparatus may include a first interface, a second interface, and a processing system. The first interface may be configured to obtain an indication of resources for training communications via a configurable reflective surface, the resources associated with training occasions, where each training occasion includes a set of multiple sub-occasions and where each sub-occasion includes a set of multiple measurement occasions. The first interface, the second interface, or the processing system may be configured to control, during a training occasion, the configurable reflective surface in accordance with a respective reflection parameter value of a set of multiple reflection parameter values for each measurement occasion of the set of multiple measurement occasions associated with the respective training occasion. The first interface or the second interface may be configured to obtain, from a first node, an indication of one of the set of multiple reflection parameter values. The first interface, the second interface, or the processing system may be configured to control, for communications between the first node and a second node, the configurable reflective surface in accordance with the indicated one of the set of multiple reflection parameter values.

Another innovative aspect of the subject matter described in this disclosure can be implemented in an apparatus for wireless communications at an assisting node (AN). The apparatus may include a processor, memory coupled with the processor, and instructions stored in the memory. The instructions may be executable by the processor to cause the apparatus to receive an indication of resources for training communications via a configurable reflective surface, the resources associated with training occasions, where each training occasion includes a set of multiple sub-occasions and where each sub-occasion includes a set of multiple measurement occasions, control, during a training occasion, the configurable reflective surface in accordance with a respective reflection parameter value of a set of multiple reflection parameter values for each measurement occasion of the set of multiple measurement occasions associated with the respective training occasion, receive, from a first node, an indication of one of the set of multiple reflection parameter values, and control, for communications between the first node and a second node, the configurable reflective surface in accordance with the indicated one of the set of multiple reflection parameter values.

Another innovative aspect of the subject matter described in this disclosure can be implemented in another apparatus for wireless communications at an assisting node (AN). The apparatus may include means for receiving an indication of resources for training communications via a configurable reflective surface, the resources associated with training occasions, where each training occasion includes a set of multiple sub-occasions and where each sub-occasion includes a set of multiple measurement occasions, means for controlling, during a training occasion, the configurable reflective surface in accordance with a respective reflection parameter value of a set of multiple reflection parameter values for each measurement occasion of the set of multiple measurement occasions associated with the respective training occasion, means for receiving, from a first node, an indication of one of the set of multiple reflection parameter values, and means for controlling, for communications between the first node and a second node, the configurable reflective surface in accordance with the indicated one of the set of multiple reflection parameter values.

Another innovative aspect of the subject matter described in this disclosure can be implemented in a non-transitory computer-readable medium storing code for wireless communications at an assisting node (AN). The code may include instructions executable by a processor to receive an indication of resources for training communications via a configurable reflective surface, the resources associated with training occasions, where each training occasion includes a set of multiple sub-occasions and where each sub-occasion includes a set of multiple measurement occasions, control, during a training occasion, the configurable reflective surface in accordance with a respective reflection parameter value of a set of multiple reflection parameter values for each measurement occasion of the set of multiple measurement occasions associated with the respective training occasion, receive, from a first node, an indication of one of the set of multiple reflection parameter values, and control, for communications between the first node and a second node, the configurable reflective surface in accordance with the indicated one of the set of multiple reflection parameter values.

In some implementations of the method, apparatuses, and non-transitory computer-readable medium described herein, each sub-occasion of the training occasion may be associated with a corresponding reflection parameter value of the set of multiple reflection parameter values and receiving the indication of one of the set of multiple reflection parameter values may include receiving an indication of one of the sub-occasions from the set of multiple sub-occasions.

In some implementations of the method, apparatuses, and non-transitory computer-readable medium described herein, each measurement occasion of each sub-occasion of the training may be associated with a corresponding reflection parameter value of the set of multiple reflection parameter values and receiving the indication of one of the set of multiple reflection parameter values may include receiving an indication of one of the measurement occasions from the set of multiple measurement occasions.

One innovative aspect of the subject matter described in this disclosure can be implemented in a method for wireless communications at a first node. The method may include receiving an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface, monitoring, during a training occasion, for signaling from a second node via the configurable reflective surface in accordance with a respective parameter for directional reception at the first node for each measurement occasion of the set of multiple measurement occasions associated with the respective training occasion, and transmitting an indication of one of the measurement occasions from the set of multiple measurement occasions and an indication of one of the sub-occasions from the set of multiple sub-occasions.

Another innovative aspect of the subject matter described in this disclosure can be implemented in an apparatus for wireless communications at a first node. The apparatus may include a first interface, a second interface, and a processing system. The first interface may be configured to obtain an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface and monitor, during a training occasion, for signaling from a second node via the configurable reflective surface in accordance with a respective parameter for directional reception at the first node for each measurement occasion of the set of multiple measurement occasions associated with the respective training occasion. The first interface or the second interface may be configured to output an indication of one of the measurement occasions from the set of multiple measurement occasions and an indication of one of the sub-occasions from the set of multiple sub-occasions Another innovative aspect of the subject matter described in this disclosure can be implemented in an apparatus for wireless communications at a first node. The apparatus may include a processor, memory coupled with the processor, and instructions stored in the memory. The instructions may be executable by the processor to cause the apparatus to receive an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface, monitor, during a training occasion, for signaling from a second node via the configurable reflective surface in accordance with a respective parameter for directional reception at the first node for each measurement occasion of the set of multiple measurement occasions associated with the respective training occasion, and transmit an indication of one of the measurement occasions from the set of multiple measurement occasions and an indication of one of the sub-occasions from the set of multiple sub-occasions.

Another innovative aspect of the subject matter described in this disclosure can be implemented in another apparatus for wireless communications at a first node. The apparatus may include means for receiving an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface, means for monitoring, during a training occasion, for signaling from a second node via the configurable reflective surface in accordance with a respective parameter for directional reception at the first node for each measurement occasion of the set of multiple measurement occasions associated with the respective training occasion, and means for transmitting an indication of one of the measurement occasions from the set of multiple measurement occasions and an indication of one of the sub-occasions from the set of multiple sub-occasions.

Another innovative aspect of the subject matter described in this disclosure can be implemented in a non-transitory computer-readable medium storing code for wireless communications at a first node. The code may include instructions executable by a processor to receive an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface, monitor, during a training occasion, for signaling from a second node via the configurable reflective surface in accordance with a respective parameter for directional reception at the first node for each measurement occasion of the set of multiple measurement occasions associated with the respective training occasion, and transmit an indication of one of the measurement occasions from the set of multiple measurement occasions and an indication of one of the sub-occasions from the set of multiple sub-occasions.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
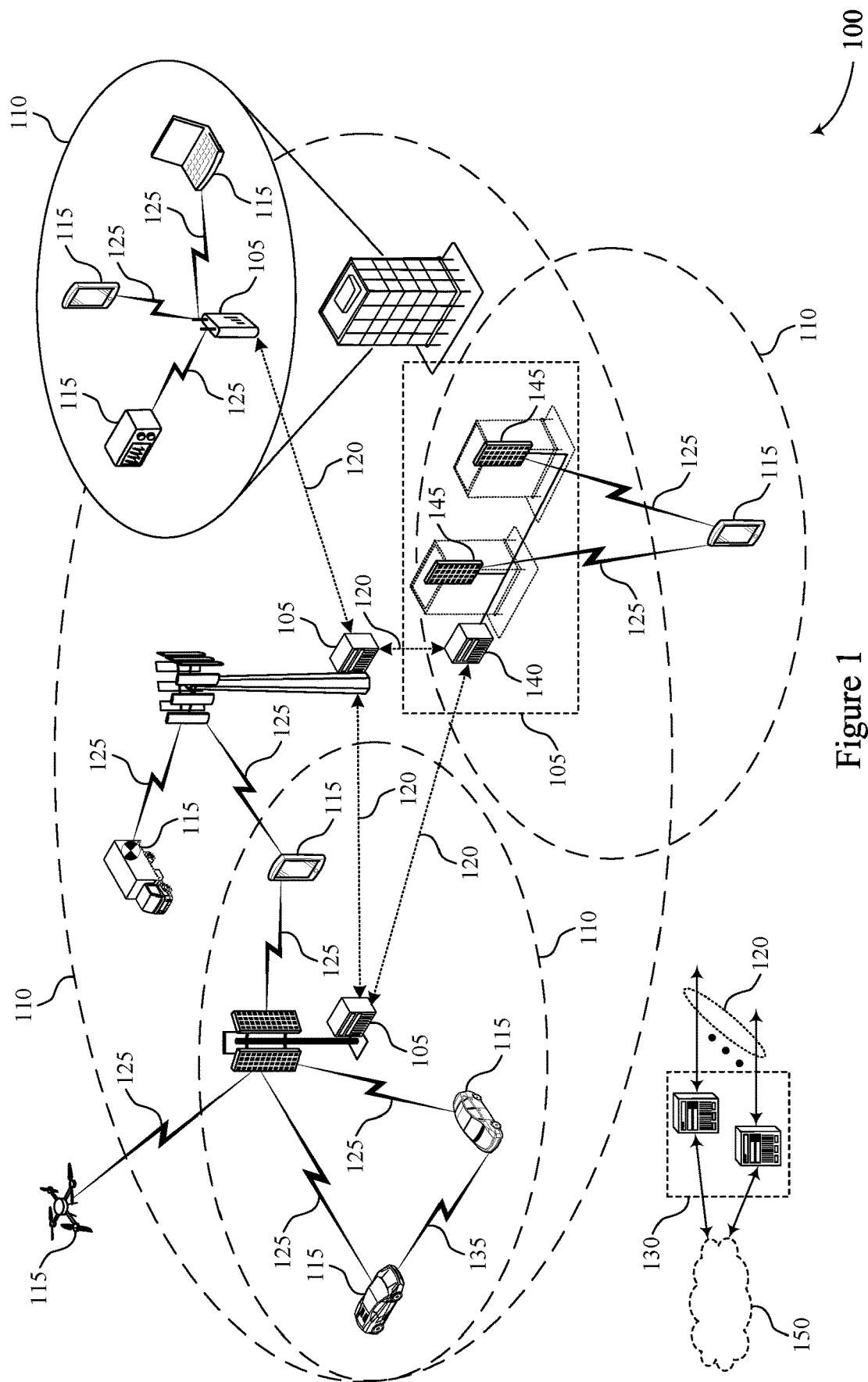
FIG. 1 shows an example wireless communications system that supports techniques for establishing directional communications via a configurable reflective surface.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some systems, two or more devices may communicate with each other over an RF band associated with a relatively high path loss. For example, two devices may attempt to communicate with each other over an FR2 (such as from about 24.25 GHz to about 52.6 GHz) or millimeter wave (mmW; such as from about 24 GHz to about 100 GHz) RF band and, to mitigate the adverse impacts of the relatively high path loss on a coverage range of the two devices, the two devices may employ a beamforming technique according to which each of the two devices align transmission and reception in specific directions. In some deployment scenarios, direct beamforming between the two devices may still be insufficient, and may fail to support a reliable communication link between the two devices. In some of such deployment scenarios in which direct beamforming between the two devices is insufficient for a reliable communication link between the two devices, the two devices may use an assisting device, such as a configurable reflective surface, to support the communication link between the devices. Some reflective surfaces may be associated with a large quantity of configurations of the surface (for different reflection directions). For such reflective surfaces, a beam training procedure between the two devices that considers or accounts for different configurations of the reflective surface may become prohibitively complex or time-consuming, as the two devices may evaluate multiple beam pairs for each configuration of the reflective surface.

In some implementations of the present disclosure, devices may leverage established communication links with an assisting node (AN) that is coupled with or otherwise able to control the configuration of the reflective surface to establish a communication link between the devices via the reflective surface. For example, the AN may establish a communication link with each of two devices via respective beam training procedures and the AN may use information, such as beam directions or other characteristics, associated with directional beams that the AN uses for communication with the two devices, as well as information associated with which of the two devices is transmitting to the other, to control a reflection characteristic of the reflective surface. In other words, the AN may use information associated with a direction of signaling, such as a direction of signal reception (such as a receive beam direction), or a direction of signal transmission (such as a transmit beam direction), or various combination thereof to determine or otherwise infer a direction of incident signaling at the reflective surface and a direction for reflected signaling from the reflective surface, and accordingly control the reflection characteristic of the reflective surface in accordance with the determined or inferred directions of incident and reflected signaling. In implementations in which a first device is attempting to transmit to a second device, for example, the AN may communicate with the first device using a first beam for directional reception of signals from the first device and may communicate with the second device using a second beam for directional transmission of signals to the second node and the AN may select, identify, determine, or otherwise ascertain a configuration for a reflection characteristic of the reflective surface in accordance with a direction of the first beam and a direction of the second beam.

Additionally, or alternatively, devices may support or otherwise participate in a system-wide beam training procedure associated with a relatively lower resource overhead as compared to an individual beam training procedure at each of the devices in scenarios in which multiple ANs or reflective surfaces are available for use. In accordance with the system-wide beam training procedure, devices may each sweep between different beams for directional communication and one or more ANs may each sweep between different configurations for a reflection characteristic of a reflective surface associated with that AN in a commonly understood manner (such as in accordance with a common or system-wide configuration). As such, for any given occasion in the system-wide beam training procedure, at least one device may be aware of which directional beam one or more other devices are using and which reflection characteristic configuration one or more ANs are using. Accordingly, at least one device may identify or otherwise obtain information associated with which reflective surface (and which configuration of that reflective surface) and which communication beams provide for a sufficient link, such as a beam pair link (BPL), between the two devices.

Particular implementations of the subject matter described in this disclosure can be implemented to realize one or more of the following potential advantages. For example, and as a result of facilitating link establishments via an assisting device, such as a reflective surface, using one or both of information associated with beams for directional communication with an associated AN or a system-wide beam training procedure, devices within the system may experience lower overhead (and synchronous) beam training and an establishment of more reliable or robust communication links over relatively higher frequency RF bands, such as FR2 or mmW RF bands. For instance, the subject matter described in this disclosure can be implemented to support a low overhead joint beam training procedure for FR2 BPL establishment. In accordance with such lower overhead and more reliable or robust communication links, devices may further experience greater spectral efficiency, higher data rates, greater system capacity, lower latency, lower time complexity, and lower power costs, among other examples.

FIG. 1 shows an example wireless communications system 100 that supports techniques for establishing directional communications via a configurable reflective surface. The wireless communications system 100 may include one or more base stations (BSs) 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of an RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (such as a duration of one modulation symbol) and one subcarrier, where the symbol period and subcarrier spacing are inversely related. The quantity of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of an RF spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission expected functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations or virtualized locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (such as LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (such as antenna panels) to conduct beamforming operations for directional communications with a UE 115. Some signals (such as synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (such as by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (such as a direction associated with the receiving device, such as a UE 115). In some implementations, the beam direction associated with transmissions along a single beam direction may be determined in accordance with a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (such as by a BS 105 or a UE 115) may be performed using multiple beam directions, and the device may use a combination of digital precoding or RF beamforming to generate a combined beam for transmission (such as from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (such as when receiving a data signal). The single receive configuration may be aligned in a beam direction determined in accordance with listening according to different receive configuration directions (such as a beam direction determined to have a highest signal strength, highest signal-to-noise ratio (SNR), or otherwise acceptable signal quality in accordance with listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

In some systems, such as the wireless communications system 100, two or more devices or nodes (which may be examples of any one or more of UEs 115, one or more components of one or more BSs 105, one or more TRPs, one or more sidelink devices, one or more relay devices, one or more small cells, or any other device capable of wirelessly communicating with at least one other device) may attempt to establish a communication link over an RF band. In some aspects, such as in aspects in which the RF band includes or is an example of a mmW, FR2, or FR4 (such as about 52.6 GHz to about 71 GHz) RF band, the two or more devices or nodes may attempt to establish the communication link using a beamforming technique. For example, the two or more devices or nodes may apply beam weights to one or more antenna elements or panels to align reception or transmission of wireless signaling in one of various directions. A link between two communicating devices established via beamforming may be referred to herein as a BPL. A BPL may refer to or include a first beam and a second beam, where the first beam may be used by a first device to transmit to or receive from a second device and the second beam may be used by the second device to transmit to or receive from the first device.

In some implementations, a first node and a second node may attempt to establish a communication link with each other using a beamforming technique and via an assisting device, such as a configurable reflective surface, controlled by an AN. In such implementations, the first node and the second node may each establish a communication link with the AN via a beam training procedure. For example, the first node and the AN may establish a first communication link associated with a first directional beam at the AN (that focuses or aligns reception or transmission along a first direction between the AN the first node) and the second node and the AN may establish a second communication link associated with a second directional beam at the AN (that focuses or aligns reception or transmission along a second direction between the AN and the second node).

The AN may receive an indication of which of the first node or the second node is a transmitter and, in some implementations, may control a reflection characteristic of the assisting device in accordance with the first directional beam (such as in accordance with the first direction), the second directional beam (such as in accordance with the second direction), and the indication of which of the first node or the second node is the transmitter. For example, the AN may select, identify, determine, or otherwise obtain or output a configuration for the reflection characteristic of the assisting device using a table (such as a table stored in a memory of the AN or received from another device) or an algorithm (such as an algorithm stored in a memory of the AN or received from another device). In accordance with the controlling of the assisting device by the AN, the first node and the second node may communicate with each other through the assisting device via a reflection of signaling off of the assisting device (such as the configurable reflective surface).

Figure 2:
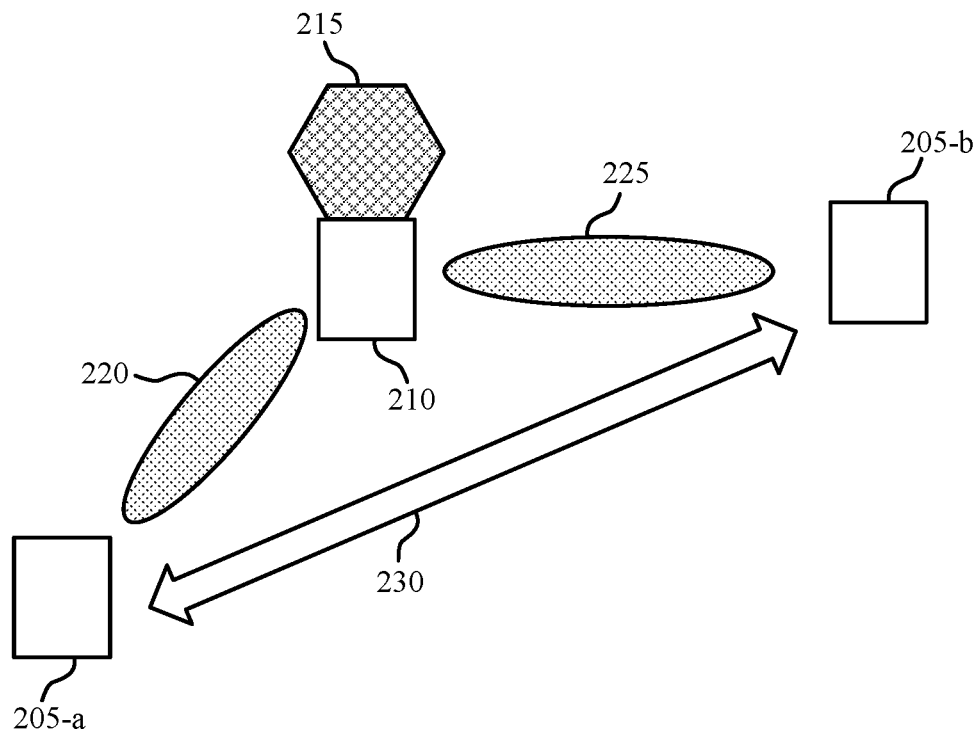
FIGS. 2 and 3 show example link establishment diagrams that support techniques for establishing directional communications via a configurable reflective surface.

FIG. 2 shows an example link establishment diagram 200 that supports techniques for establishing directional communications via a configurable reflective surface. The link establishment diagram 200 may implement or be implemented to realize aspects of the wireless communications system 100. For example, the link establishment diagram 200 includes a node 205-a, a node 205-b, an AN 210, and an assisting device 215. The node 205-a, the node 205-b, and the AN 210 may be examples of UEs 115 as described with reference to FIG. 1, one or more components of one or more BSs 105 as described with reference to FIG. 1, one or more TRPs, one or more sidelink devices, one or more relay devices, one or more small cells, one or more roadside units (RSUs), or any other device capable of wirelessly communicating with at least one other device, or any combination thereof. The assisting device 215 may be an example of a reflective surface, such as a configurable reflective surface that can be controlled by the AN 210.

The node 205-a, the node 205-b, and the AN 210 may be capable of communication over relatively higher RF bands, such as FR2 or mmW RF bands, and may be capable of beamforming mmW transmissions. For example, to support reliable communication over FR2 or mmW RF bands, devices may employ beamforming techniques and spatial filtering to achieve a sufficient coverage range due to an inherent path loss associated with such RF bands. The node 205-a, the node 205-b, and the AN 210 also may be capable of communication over relatively lower RF bands, such as sub-6 GHz (FR1) links or RF bands and may communicate over such relatively lower RF bands omnidirectionally or with relatively wider beams (as compared to communication over mmW or FR2 RF bands).

In some aspects, the node 205-a and the node 205-b may establish a communication link 230 associated with such a relative lower RF band (such that the communication link 230 may be an example of an FR1 or sub-6 GHz link between the node 205-a and the node 205-b). Additionally, or alternatively, the node 205-a and the node 205-b may establish the communication link 230 using a relatively higher RF band (such as an FR2 or mmW RF band) but the communication link 230 may be associated with a relatively low quality of service (QoS), such as a QoS lower than a threshold QoS.

To support (and, in some aspects, prior to) communication over mmW communication links, communicating or communication nodes (such as any two or more of the node 205-a, the node 205-b, and the AN 210) may perform an initial beam discovery and alignment procedure. In some aspects, a first node may perform an initial exhaustive search for one or more other nodes to configure a BPL between the first node and each of the one or more other nodes. A BPL may refer to a first beam used by the first node and a second beam used by a second node such that the first node uses the first beam for communication with (for transmitting to or receiving from) the second node and such that the second node uses the second beam for communication with (for transmitting to or receiving from) the first node.

Communication nodes may perform the initial beam discovery procedure over resources (such as time and frequency resources) that are known by other devices in the system. For example, the communication nodes may perform the initial beam discovery procedure over resources associated with a synchronization channel for Uu links or over semi-statically configured resources for sidelinks. In some aspects, the discovery procedure may be associated with detecting, at a first node, synchronization signals or specialized (such as dedicated or selectively configured) beam training reference signals transmitted from a second node.

Beam failure may be a challenge in some mmW systems. For example, mmW links may be easily blocked (via human blockage or blockage by metallic objects such as vehicles, among other examples) and may be associated with a relatively high path loss, which may impede signal propagation. As such, under some adverse channel conditions, a communication node may be unable to form (or maintain) a mmW BPL or may be unable to form (or maintain) a mmW BPL meeting or satisfying a QoS criterion (such as an achievable rate or an SNR, among other examples).

In some systems, and as shown in the link establishment diagram 200, a mmW device (such as a device capable of communicating via a mmW link) may leverage an AN 210 to form an assisted mmW BPL. An AN 210 may be an example of a communication node which is or which controls an assisting device 215. An assisting device 215 may be an example of a repeater, a re-configurable intelligent surface, or a relay node. An assisting device 215 may be an active device (such as a device that draws power from a power source) or may be a passive device (such as a device that does not draw power or that is unable to make configuration or processing decisions). In some aspects, an assisting device 215 may enable BPL creation by amplifying a signal and forwarding the amplified signal, reflecting a signal in a direction of an intended receiver, or by decoding and forwarding data packets (such as by relaying information), or any combination thereof.

In some implementations, an assisting device 215 may be or include a passive reflective intelligent surface (RIS) and an AN 210 may control the assisting device 215. An RIS may function similarly to a mirror or other reflective surface in its ability to reflect incident beams or waves (such as light waves), but may differ in that an RIS may include one or more components that are able to control or dictate how an incident beam or wave is reflected (such that an angle of incidence can be different than an angle of reflection) or that are able to control or dictate a shape of a reflected beam (such as via energy focusing or energy nulling via constructive interference or destructive interference, respectively), or both. For example, an RIS may include a quantity of elements (such as reflective elements) that each have a controllable delay, phase, or polarization, or any combination thereof, and the AN 210 may control or configure each of the elements to control how an incident beam or wave is reflected or to control a shape of a reflected beam. An RIS may be an example of or may otherwise be referred to as a software-controlled metasurface or a reconfigurable intelligent surface, and may sometimes be a metal surface including a quantity of reflective elements.

The AN 210 may be co-located (and, for example, have an electronic or fiber optic coupling) with the assisting device 215 or may be located at a different physical or geographic location than the assisting device 215. The AN 210, regardless of whether co-located with the assisting device 215 or located at a different physical or geographic location than the assisting device 215, may control the assisting device 215 in accordance with setting one or more parameters of the assisting device 215 to reflect signaling (mmW beams). For instance, the AN 210 (which may be an example of a UE 115 or a network entity or device (such as one or more components of a BS 105)) may control the assisting device 215 and the assisting device 215 may set or otherwise configure one or more phase shifters or weights (for one or more of a quantity of reflective elements) to reflect an incident wave in a desired direction in accordance with the controlling by the AN 210. In some aspects, the assisting device 215, if functioning as an RIS, may be unable to transmit or receive signals from communication nodes. In other words, for example, the assisting device 215 may reflect signaling but may be unable to actually receive and decode the signaling (such that all reflective elements of the assisting device 215, if functioning as an RIS, are passive). Alternatively, the assisting device 215 may include a first portion of reflective elements that are passive and a second portion of reflective elements that are active. Additionally, or alternatively, all the reflective elements of the assisting device 215 may be capable of both passive and active operation.

To enable an RIS-enabled link establishment (such as an FR2 link establishment) between the node 205-a and the node 205-b via the AN 210 and the assisting device 215, the node 205-a and the node 205-b may perform a beam sweeping procedure in conjunction with a configuration sweep at the assisting device 215. For example, to establish a BPL over an FR2 RF band, the node 205-a and the node 205-b may perform $N^{Tx} \times N^{Rx}$ beam sweeps (where $N^{Tx}$ corresponds to a quantity of different transmit beams that a transmitter may try and $N^{Rx}$ corresponds to a quantity of different receive beams that a receiver may try) and, if the node 205-a and the node 205-b attempt to use the assisting device 215 for beam discovery, the assisting device 215 may additionally try multiple different configurations to enable a signal sent from a transmitter to successfully reach an intended receiver. As such, the node 205-a, the node 205-b, and the AN 210 (controlling the assisting device 215) may perform $N^{Tx} \times N^{Rx} \times N^{RIS}$ beam sweeps (where $N^{RIS}$ corresponds to a quantity of different configurations for a reflection characteristic of the assisting device 215).

Such $N^3$ complexity (resulting from three devices each cycling or sweeping across different beams or configurations) may be prohibitive for some system deployments or for some device capabilities. Further, the quantity of configurations that the assisting device 215 (such as an RIS) may try to provide a suitable BPL may be relatively greater than (such as significantly greater than) the quantities of the different transmit beams and the different receive beams, and transmit beams and receive beams associated with the assisting device 215 may not be de-coupled or may be separately controlled. In other words, if two mmW nodes (such as the node 205-a and the node 205-b) have an established signaling radio bearer (SRB) over a mmW link or over an FR1 link (such as the communication link 230), to establish a relatively higher QoS FR2 BPL or an FR2 link (any QoS FR2 link) in scenarios in which such a relatively higher QoS FR2 BPL or FR2 link is not available directly, the mmW nodes may use an RIS to form this link. Thus, and due, in part, to RISs being passive devices with a capability for controlling weights of the RIS, beam training overhead between the node 205-*a* and the node 205-*b* via the assisting device 215 may be prohibitively large.

In some implementations, and to avoid such potentially prohibitive complexity associated with establishment of a BPL using the assisting device 215 and a full beam and configuration sweep, the AN 210 may limit a search space (leading to faster beam discovery) if the AN 210 has an FR2 capability in accordance with establishing an FR2 link with the node 205-*a* and the node 205-*b*. In other words, in scenarios in which the AN 210 and the assisting device 215 (an RIS) are co-located and in which the AN 210 has a mmW capability (such as is able to communicate over mmW bands used by the node 205-*a* and the node 205-*b*), the AN 210 may leverage a transfer learning, such as learning associated with relative directions or positioning of communicating nodes, to reduce overhead associated with establishment of a BPL between the node 205-*a* and the node 205-*b*.

In accordance with the transfer learning, the AN 210 may use an existing BPL between the AN 210 and the node 205-*a* and between the AN 210 and the node 205-*b* to identify, select, determine, ascertain, or otherwise obtain an RIS configuration for the assisting device 215 that may provide or otherwise facilitate a suitable BPL between the node 205-*a* and the node 205-*b*. For example, the AN 210 may use training information (such as beam training information or other information pertaining to signaling directions) between the AN 210 and the node 205-*a*, and between the AN 210 and the node 205-*b* to control a reflection characteristic of the assisting device 215 (such as to determine a configuration of the RIS or of multiple RISs controlled by the AN 210). In other words, the AN 210 may use beam training information between the AN 210 and the node 205-*a* determine or otherwise infer a first direction between the AN 210 and the node 205-*a*, and use beam training information between the AN 210 and the node 205-*b* to determine or otherwise infer a second direction between the AN 210 and the node 205-*b*. In various implementations, one of the first direction or the second direction may correspond to or be representative of a possible direction of incident signaling on the assisting device 215, and the other of the first direction or the second direction may correspond to or be representative of a possible direction of reflected signaling from the assisting device 215, and the AN 210 may use such indications of possible directions of incident and reflected signaling to inform a determination of one or more values (such as one or more candidate values) of a reflection characteristic at the assisting device 215.

As part of the BPL establishment via the AN 210, a communication node (such as at least one of the node 205-*a* and the node 205-*b*) may know or discover a presence of the AN 210 and, if the communication node measures, identifies, or otherwise determines that the communication mode is unable to form a mmW BPL with another node, the communication node may communicate with the AN 210 to initiate the BPL establishment via the AN 210. For example, if the node 205-*a* is attempting to establish a communication link (an mmW BPL) with the node 205-*b* and measures, identifies, or otherwise determines that the node 205-*a* is unable to establish the FR2 or mmW link without assistance from the AN 210 and the assisting device 215, the node 205-*a* may establish an RRC connection and an SRB with the AN 210 (if the node 205-*a* does not already have an RRC connection with the AN 210).

The node 205-*a* and the AN 210 may establish the RRC connection and SRB over a mmW band or over a sub-6 GHz band. In implementations in which the node 205-*a* and the AN 210 establish the SRB over a sub-6 GHz band (such as an FR1 band), the node 205-*a* may initiate a beam training procedure with the AN or may measure one or more signals (such as reference signals or synchronization signals) that the AN 210 may transmit periodically to form an mmW or FR2 link. In some implementations, for example, the node 205-*a* may act as an initiator and may initiate a beam training with the AN 210 according to which the node 205-*a* and the AN 210 may identify, select, or otherwise determine an mmW BPL between the node 205-*a* and the AN 210.

In some other implementations, and if the AN 210 transmits synchronization signals periodically, the node 205-*a* may use the synchronization signals transmitted by the AN 210 to form an initial BPL (such as an initial mmW BPL). Alternatively, in implementations in which the node 205-*a* and the AN 210 establish the SRB over an FR2 RF band, the node 205-*a* and the AN 210 may use the BPL associated with the SRB as the initial BPL (such as the initial mmW BPL). In some aspects, the BPL (the mmW or FR2 BPL) between the node 205-*a* and the AN 210 may be associated with a beam 220 that the AN 210 uses for communication with the node 205-*a*. The beam 220 may be associated with a first parameter or configuration for directional communication with the node 205-*a*, such as a first beamforming direction, a first set of beam weights, a first beam index or identifier, a first antenna port, or any other parameter or configuration that supports a determination or inference of a direction or range of directions between the node 205-*a* and the AN 210 or the assisting device 215.

In some implementations, the node 205-*a* may notify the AN 210 of another device (such as a peer) with which the node 205-*a* is attempting to establish an FR2 link. For example, the node 205-*a* may transmit, to the AN 210, an indication of one or more identifiers (IDs) associated with the node 205-*b*. Such one or more IDs associated with the node 205-*b* may include a Layer 2 (L2) ID, a radio network temporary ID (RNTI), a cell ID, a zone ID, or a group ID, among other examples. The node 205-*a* also may transmit an indication of a device type of the node 205-*b* to the AN 210. For example, the node 205-*a* may indicate, to the AN 210, whether the node 205-*b* is a UE 115, one or more components of a BS 105, or an RSU, among other examples.

The AN 210 may establish a connection and a BPL with the node 205-*b* in accordance with receiving the indication of the node 205-*b* from the node 205-*a* (if the AN 210 is not already connected with the node 205-*b*). For example, if the AN 210 has already connected to the node 205-*b* or has performed beam training with the node 205-*b* and if an SRB with the node 205-*b* is not established, the AN 210 may establish an SRB with the node 205-*b*. Alternatively, if the AN 210 is not connected to the node 205-*b*, the AN 210 may establish a connection (such as an RRC connection) with the node 205-*b* depending on the device type of the node 205-*b*.

In implementations in which the AN 210 is a UE and the node 205-*b* is also a UE, the AN 210 may discover (via a sidelink discovery procedure) the node 205-*b* and establish an SRB with the node 205-*b* in accordance with the sidelink discovery procedure. Alternatively, in implementations in which the AN 210 is a UE and the node 205-*b* is one or more components of a BS 105 (such as a network entity or device), the AN 210 may listen to one or more FR2 synchronization signals (such as one or more synchronization signal blocks (SSBs)) that the node 205-*b* transmits, may transmit random access signaling to the node 205-*b* over a random access channel (RACH) as part of a random access procedure, and may form an SRB with the node 205-*b* if the random access procedure is successful. In some aspects, the BPL (the mmW or FR2 BPL) between the node 205-b and the AN 210 may be associated with a beam 225 that the AN 210 uses for communication with the node 205-b. The beam 225 may be associated with a second parameter or configuration for directional communication with the node 205-b, such as a second beamforming direction, a second set of beam weights, a second beam index or identifier, a second antenna port, or any other parameter or configuration that supports a determination or inference of a direction or range of directions between the node 205-b and the AN 210 or the assisting device 215.

The AN 210 may identify, select, determine, or otherwise obtain a configuration for the assisting device 215 in accordance with establishing an SRB and a BPL (such as mmW or FR2 BPLs) with each of the node 205-a and the node 205-b (which may be based on the first parameter or configuration for directional communication and on the second parameter or configuration for directional communication). In some implementations, the AN 210 may be pre-configured (such as pre-loaded) with a configuration associated with a given pair of beams, or other parameter or configuration for directional communication. For example, the AN 210 may be pre-configured with a table that may indicate or provide mappings between beams or beam directions that the AN 210 uses to communicate with each of the node 205-a and the node 205-b and a configuration of the assisting device 215. In other words, the AN 210 may use the table or mapping to identify, select, determine, or otherwise obtain a configuration for the assisting device 215 in accordance with using the beam 220 for communication with the node 205-a and the beam 225 for communication with the node 205-b. An example mapping between communication beams from the AN 210 to configurations for the assisting device 215 are shown below in Table 1.

TABLE 1

| Incident Beam | Desired Reflected Beam | RIS Configuration |
|---|---|---|
| Beam A | Beam B | $C_{A \rightarrow B} = \theta_0, \phi_0, \alpha_0$ |
| Beam A | Beam C | $C_{A \rightarrow C} = \theta_2, \phi_0, \alpha_1$ |
| . | . | . |
| . | . | . |
| . | . | . |
| Beam B | Beam A | $C_{B \rightarrow A} = \theta_4, \phi_8, \alpha_8$ |
| Beam B | Beam C | $C_{B \rightarrow C} = \theta_4, \phi_{10}, \alpha_8$ |
| . | . | . |
| . | . | . |
| . | . | . |

For example, if the beam 220 is associated with or denoted as a beam A and if the beam 225 is associated with or denoted as a beam B, the AN 210 may use the table or the mapping to identify, select, or otherwise determine a configuration $C_{A \rightarrow B}$ or $C_{A \rightarrow B}^{\ell}$ (where an index value of $\ell$ may correspond to some index associated with multiple options for $C_{A \rightarrow B}$, where $\ell = 0$ for a first of one or more options, or may correspond to a specific assisting device 215 controlled by the AN 210). The configuration $C_{A \rightarrow B}^{\ell}$ may indicate one or more weights, one or more phase shift values, or any other parameters that the AN 210 may use to configure or control the assisting device 215. For example, the configuration $C_{A \rightarrow B}^{\ell} = \{\theta_0, \phi_0, \alpha_0\}$, where $\theta$ and $\phi$ correspond to phase shifts and $\alpha$ corresponds to a weight. For a reverse link (for communication from the node 205-b to the node 205-a, which also may be referred to as if the beam B is transmitting the beam A), the AN 210 may select a configuration $C_{A \rightarrow B}^{\ell}$ for the assisting device 215 (in implementations in which the AN 210 uses a look-up table). Such a reverse link may be associated with bi-directional traffic or feedback from the node 205-b to the node 205-a. In some aspects, different $C_{i \rightarrow j}^{\ell}$ parameters may be referred to herein as different reflection parameter values or as different parameters for the reflection characteristic of the assisting device 215.

The pre-configuration of the table or mapping may be associated with a lookup table or resource, may be pre-defined by a formula, or may be associated with an algorithm. In some aspects, the table or mapping may be static. In some other aspects, the AN 210 may update or modify the table or mapping over time (in accordance with beam training, measurement reporting, or a machine learning (ML)-based procedure or algorithm). Further, although described in the context of being pre-configured, the table or mapping may additionally, or alternatively, be signaled wirelessly. For example, the AN 210 may receive (from a network entity) an indication of the table or mapping and, in some implementations, may receive updates or modifications to the table or mapping.

In some aspects, a BPL between the AN and one of the node 205-a or the node 205-b may change. For example, if the AN 210 switches from using a beam B to communicate with the node 205-b to using a beam C to communicate with the node 205-b due to a movement of the node 205-b or some other channel dynamics, the AN 210 may update the configuration of the assisting device 215 in accordance with the use of the beam C. With reference to Table 1, for example, the AN 210 may switch from using $C_{A \rightarrow B}^{\ell} = \{\theta_0, \phi_0, \alpha_0\}$ to using $C_{A \rightarrow C}^{\ell} = \{\theta_2, \phi_0, \alpha_1\}$. The AN 210 may update the configuration for the assisting device 215 in accordance with the lookup table or resource, the formula, or the algorithm, any of which may be pre-defined (such as pre-loaded or pre-configured) at the AN 210 or signaled to the AN 210.

In some implementations, the AN 210 may be unable to update the configuration of the assisting device 215 due to the switch from the beam B to the beam C. For example, if the node 205-b moves behind the assisting device 215 (an RIS) or if the AN 210 does not control any RISs that are available to cover the region associated with the beam C, the AN 210 may be unable to facilitate a link between the node 205-a and the node 205-b. In some aspects, the AN 210 may allow the other node (the node 205-a) to measure, identify, or otherwise determine that no configuration for the assisting device 215 is available through link or beam management or a link or beam failure procedure. In other words, the AN 210 may refrain from transmitting signaling to the node 205-a indicating that the assisting device 215 is no longer able to assist in BPL formation between the node 205-a and the node 205-b and may let the node 205-a measure, identify, or otherwise determine that the AN 210 is no longer able to assist in BPL formation on its own. In some other aspects, the AN 210 may notify the other node (the node 205-a) that the connection between the node 205-a and the node 205-b via the assisting device 215 may be lost due to the beam change associated with the node 205-b. In such aspects, the node 205-a may proactively search for or switch to an alternative BPL (as a result of receiving the indication from the AN 210).

In some implementations, a communication node (such as one of the node 205-a or the node 205-b) or the AN 210 may trigger an online beam refinement procedure. The online beam refinement procedure may be triggered by self-measurements, measurement reports received from other nodes, or changes in the environment or deployment scenario. For example, the node 205-a may trigger an online beam refinement if the node 205-a detects, measures, identifies, or otherwise determines a degradation in the BPL (between the node 205-a and the node 205-b). Additionally, or alternatively, the AN 210 may trigger the online beam refinement if the AN 210 detects, measures, identifies, or otherwise determines a change in a beam configuration. Further, any of the nodes (such as any of the node 205-a, the node 205-b, or the AN 210) may trigger an online beam refinement in accordance with or as a result of one or more measurements, reports, or capabilities.

Additionally, or alternatively, a node may trigger an online beam refinement (an online beam training) if an offline algorithm, lookup table or resource, or mapping results in or otherwise outputs multiple unique configurations for the assisting device 215. The node triggering or otherwise determining that an online beam refinement or training is suitable may notify other nodes over an existing SRB. In some implementations, and in accordance with triggering or determining that an online refinement is suitable, the AN 210 may select a set of configurations for the online refinement $C_{i,j} = \{C_{ij}^1, \ldots C_{ij}^K\}$. The set of configurations may include configurations associated with some relatively higher likelihood for BPL establishment between the node 205-a and the node 205-b or may include multiple configurations corresponding to a single output from the algorithm, lookup table or resource, or mapping, or any combination thereof.

As part of the online beam refinement procedure (which may be referred to as an adaptive online training procedure), the AN 210 may notify the node 205-a and the node 205-b of a quantity of configurations (such as a size of the set $C_{i,j}$) that the AN 210 may use for the online beam refinement procedure. In some aspects, the AN 210 may signal the quantity of configurations to the node 205-a and the node 205-b over established SRBs. In some aspects, the AN 210 also may indicate, to one or both of the node 205-a or the node 205-b, a mapping between assisting device 215 configuration $C_{ij}^\ell$ and a beam training occasion. As such, one or both of the node 205-a or the node 205-b may be aware of at which time(s) or for what duration the assisting device 215 has a given configuration.

As the AN 210 cycles through the set of configurations $C_{i,j}$ for the assisting device 215, the node 205-a and the node 205-b may transmit or receive beamformed synchronization signals, CSI-RSs, or beam training reference signals, or any combination thereof. In some aspects, the node 205-a and the node 205-b may limit the transmission and reception to a sector or angular region associated with or defined by the beams with which the node 205-a and the node 205-b established connections to the AN 210. For example, the node 205-a and the node 205-b may limit the transmission and reception to a sector or angular region associated with or defined by a first beam that is oriented toward beam A and a second beam that is oriented toward beam B, respectively (or a sector or angular region associated with or defined by beam A and beam B, respectively, themselves). Such a sector or angular region associated with or defined by a beam may be defined in accordance with a table, a mapping, an algorithm, or may be signaled.

The node 205-a and the node 205-b may measure a signal strength or quality across multiple different beam pairs and across multiple different configurations of the assisting device 215 and may signal a report associated with the measuring. In some implementations, the node 205-a and the node 205-b may exclusively perform measurement reporting between each other over an established SRB (such as over the communication link 230). In some other examples, the nodes may perform the measurement reporting such that the measurement reporting is made between the AN 210 and one or more of the communication nodes (such as one or both of the node 205-a or the node 205-b).

In implementations in which the measurement reporting is exchanged exclusively between the communication nodes, one of the communication nodes may indicate, to the AN 210, a selected configuration for the assisting device 215. In such implementations, the communication node indicating the selected configuration may identify or otherwise determine the configuration in accordance with a mapping between a measurement opportunity over which the BPL is established and the selected configuration. In implementations in which the AN 210 receives the measurement reporting, the AN 210 may self-select or determine a configuration (an RIS configuration) for the assisting device 215. Further, if no relatively better (higher signal strength or quality) BPL is found during the online beam refinement, the nodes may continue using a current configuration and one or both of the communication nodes may indicate that no better BPL was found during the online beam refinement to the AN 210. Further, to form a reverse link (for bi-directional traffic or feedback), the communication nodes may again perform an online beam refinement with the same AN 210 or may perform an online beam refinement with a different AN 210.

Figure 3:
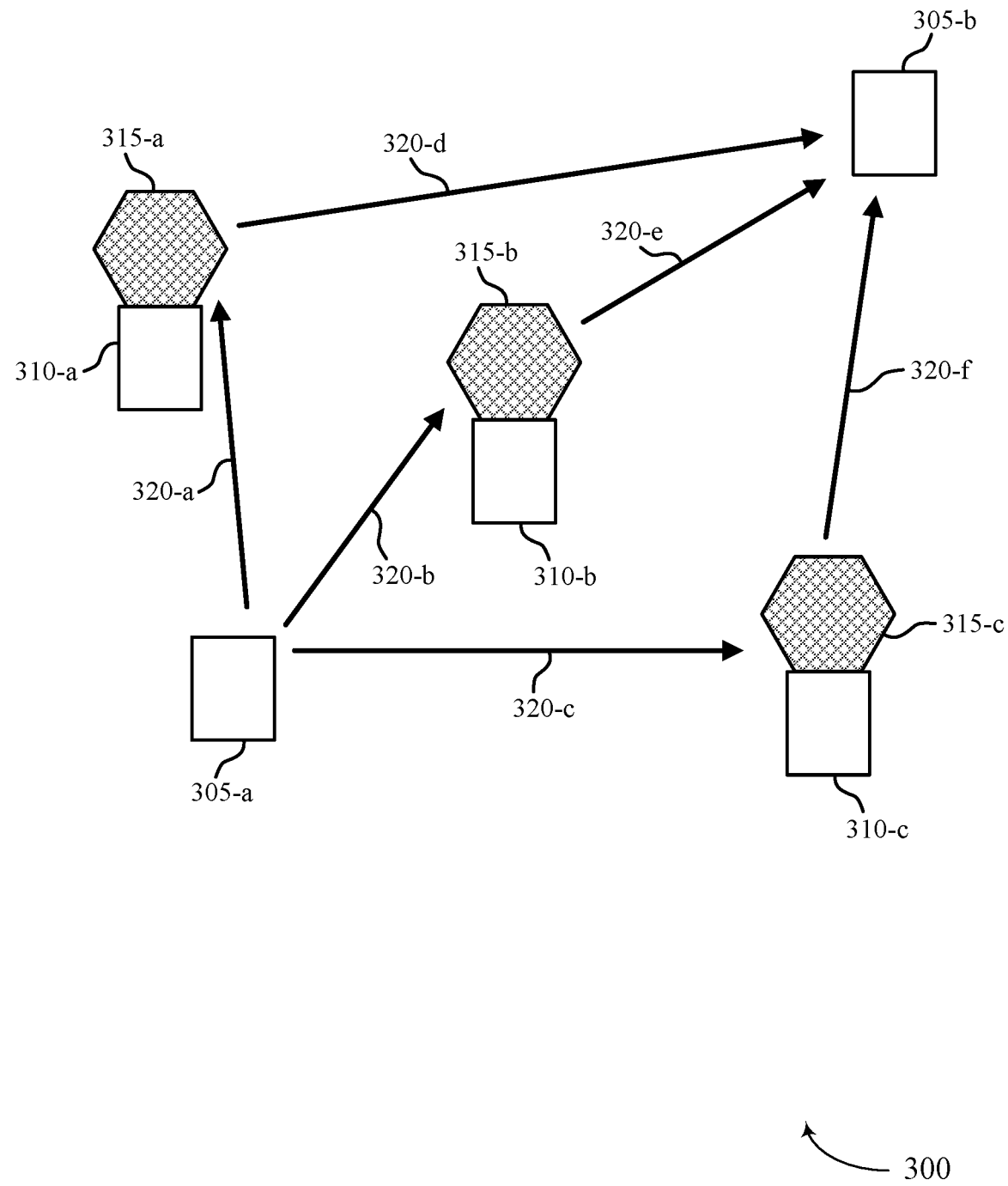

FIG. 3 shows an example link establishment diagram 300 that supports techniques for establishing directional communications via a configurable reflective surface. The link establishment diagram 300 may implement or be implemented to realize aspects of the wireless communications system 100 or the link establishment diagram 200. For example, the link establishment diagram 300 includes a node 305-a, a node 305-b, an AN 310-a, an AN 310-b, and an AN 310-c. The AN 310-a may control an assisting device 315-a, the AN 310-b may control an assisting device 315-b, and the AN 310-c may control an assisting device 315-c.

The node 305-a and the node 305-b may be examples of a node 205-a and a node 205-b, respectively, as illustrated by and described with reference to FIG. 2. The ANs 310 (which may include or refer to any one or more of the AN 310-a, the AN 310-b, and the AN 310-c) may be examples of an AN 210 as illustrated by and described with reference to FIG. 2. The assisting devices 315 (which may include or refer to any one or more of the assisting device 315-a, the assisting device 315-b, and the assisting device 315-c) may be examples of an assisting device 215 as illustrated by and described with reference to FIG. 2. The assisting devices 315 may be examples of repeaters, re-configurable intelligent surfaces, relays, configurable reflective surfaces, RISs, or any combination thereof.

In some aspects, and as shown in the link establishment diagram 300, multiple assisting devices 315 and multiple ANs 310 may be present in a vicinity of a communication node (such as one or both of the node 305-a or the node 305-b) and, in such aspects, selecting a suitable BPL with consideration to a set of possible links (such as a set of possible BPLs through every AN 310) may be associated with a prohibitively high overhead. For example, to establish a BPL (such as an FR2 BPL) between the node 305-a and the node 305-b, the node 305-a and the node 305-b may perform $N^{Tx} \times N^{Rx}$ beam sweeps as part of an "exhaustive" beam sweep and, if the node 305-a and the node 305-b are unable to establish a BPL of a suitable QoS through the beam sweep, the node 305-*a* and the node 305-*b* may try to form the link via an assisting device 315 (such as any one or more of the assisting device 315-*a*, the assisting device 315-*b*, and the assisting device 315-*c*).

For example, if two mmW nodes (such as the node 305-*a* and the node 305-*b*) have an established SRB over mmW or over FR1 but are unable to establish a high QoS FR2 BPL or an FR2 BPL (of any QoS) directly, the two mmW nodes may attempt to use an AN 310 to form the high QoS FR2 BPL or the FR2 BPL. If an assisting device 315 is used for beam establishment, the assisting device 315 may try multiple configurations to enable or facilitate a signal from a transmitting node (such as a transmitting UE 115) to successfully reach a receiving node (such as a receiving UE 115). As such, the assisting device 315, if an example of or otherwise functioning as an RIS, may be associated with $N^{Tx} \times N^{Rx} \times N^{AD}$ beam sweeps or, if an example of or otherwise functioning as an active repeater, may be associated with $2 \times N^{Tx} \times N^{Rx}$ beam sweeps. $N^{AD}$ may refer to a quantity of configurations of a given assisting device 315. The quantity of configurations that the assisting device 315 may try to provide a suitable BPL may be much higher than a quantity of transmit or receive beams that the node 305-*a* and the node 305-*b* may use and an overall or total number of beam sweeps may be $P \times N^{Tx} \times N^{Rx} \times N^{AD}$, where P refers to a quantity of the assisting devices 315 in a system or vicinity.

As such, link establishment may become challenging in deployment scenarios associated with a distributed system including multiple terminals and multiple assisting devices 315. For example, and as shown in the link establishment diagram 300, the node 305-*a* may form a BPL with the node 305-*b* through any of the three assisting devices 315 (such as any one or more of the assisting device 315-*a*, the assisting device 315-*b*, and the assisting device 315-*c*) in the vicinity of the node 305-*a*. In other words, in such examples of distributed systems, there may be multiple nodes in a system and each node may try to establish a link with another node. For example, the node 305-*a* may form a BPL with the node 305-*b* via any of a link 320-*a* and a link 320-*d* via the AN 310-*a* and the assisting device 315-*a*, a link 320-*b* and a link 320-*e* via the AN 310-*b* and the assisting device 315-*b*, or a link 320-*c* and a link 320-*f* via the AN 310-*c* and the assisting device 315-*c*. Further, both the node 305-*a* and the node 305-*b* may attempt to connect with any additional communication nodes in the system, which may further increase complexity associated with an availability of multiple paths through multiple ANs 310.

To form a BPL to other communication nodes (such as other peer devices, like UEs 115), a node or terminal may perform an exhaustive search through each assisting device 315, which may include finding, calculating, measuring, or otherwise determining a "best" direction (a direction associated with a greatest signal strength or signal quality) towards that assisting device 315 in addition to that assisting device 315 (via a controlling AN 310) finding, calculating, measuring, or otherwise determining a "best" direction (a direction associated with a greatest signal strength or signal quality) to the peer node. In other words, a pair of communication nodes may train with multiple ANs 310 and assisting devices 315 and multiple pairs of communication nodes may train using a same AN 310.

As such, if multiple ANs 310 and assisting devices 315 are present, individually training beams through each AN 310 or each assisting device 315 may not be feasible due to large overhead. For instance, the overhead to create a BPL over a single AN 310 and assisting device 315 may be relatively high and this overhead may increase if multiple assisting devices 315 are present. The problem becomes more difficult if multiple communication nodes are present as well and, for sidelink communications (for scenarios in which the node 305-*a*, the node 305-*b*, and the ANs 310 are sidelink UEs 115), the overhead to search and manage BPLs through assisting devices 315 may increase even more.

In some implementations, the node 305-*a*, the node 305-*b*, the ANs 310, and the assisting devices 315 may support a synchronized or mutually understood beam training procedure between multiple communication nodes and ANs 310 if multiple communication nodes and multiple ANs 310 are present in the system. As part of the synchronized or mutually understood beam training procedure, the node 305-*a*, the node 305-*b*, the ANs 310, and the assisting devices 315 may employ a method for low overhead synchronous beam training with ANs 310 and devices in a multi-terminal scenario.

Figure 4:
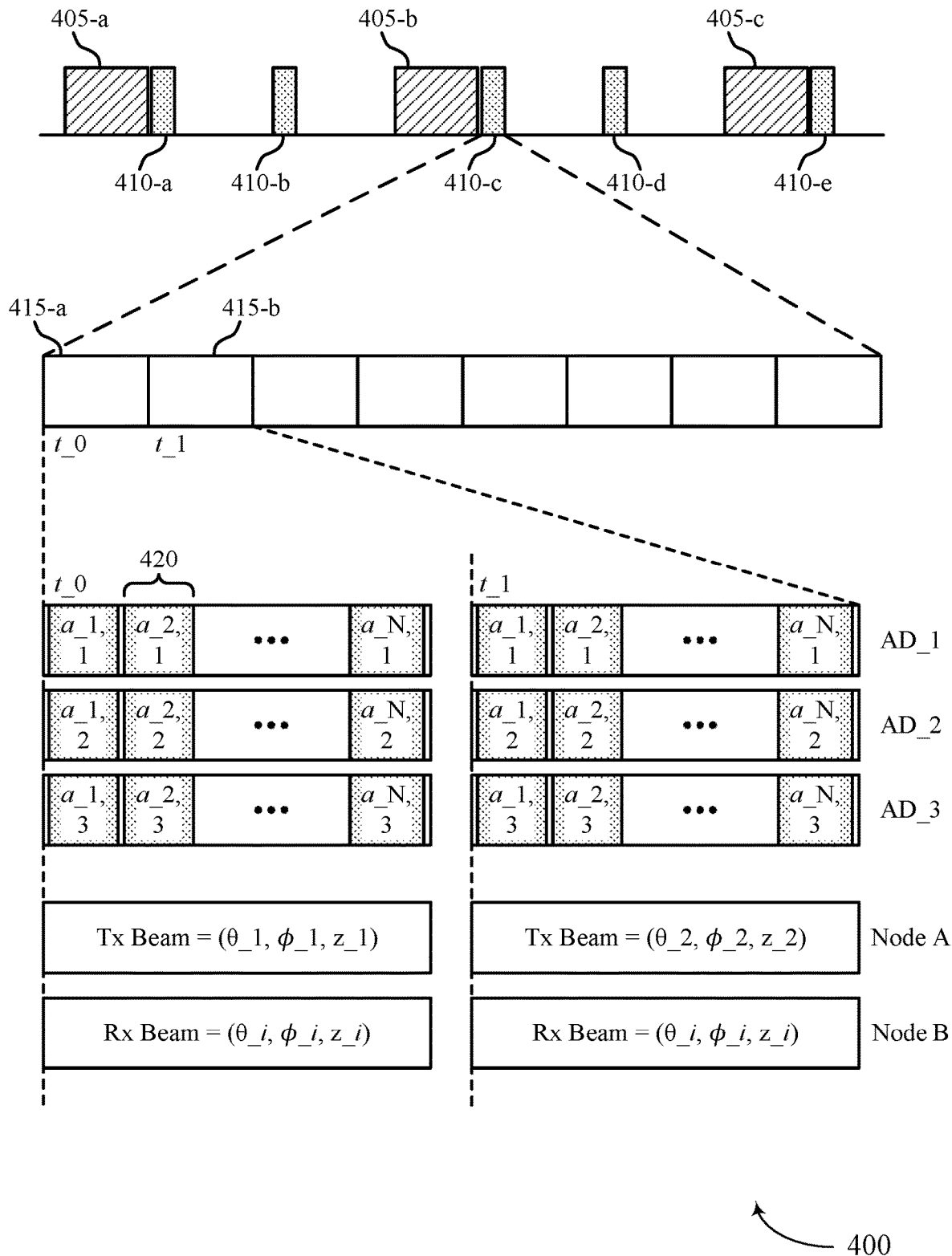
FIG. 4 shows an example beam training procedure that supports techniques for establishing directional communications via a configurable reflective surface.

FIG. 4 shows an example beam training procedure 400 that supports techniques for establishing directional communications via a configurable reflective surface. The beam training procedure 400 may implement or be implemented to realize aspects of the wireless communications system 100, the link establishment diagram 200, or the link establishment diagram 300. For example, the beam training procedure illustrates a synchronized, mutually, or commonly known or configured beam training procedure 400 according to which a node A and a node B may measure, detect, identify, select, or otherwise determine which of a first assisting device (an $AD_1$ or AD_1), a second assisting device (an $AD_2$ or AD_2), or a third assisting device (an $AD_3$ or AD_3) to use for establishment of a BPL (such as a mmW or FR2 BPL) between the node A and the node B.

The node A and the node B may be examples of the node 205-*a* and the node 205-*b*, respectively, as illustrated by and described with reference to FIG. 2 or may be examples of the node 305-*a* and the node 305-*b*, respectively, as illustrated by and described with reference to FIG. 3. The first assisting device, the second assisting device, and the third assisting device may be examples of the assisting device 215 as illustrated by and described with reference to FIG. 2 or of any of the assisting devices 315 as illustrated by and described with reference to FIG. 3. In some aspects, each of the first assisting device, the second assisting device, and the third assisting device may be coupled with or otherwise controlled by an AN, which may be an example of an AN 210 as illustrated by and described with reference to FIG. 2 or of any of the ANs 310 as illustrated by and described with reference to FIG. 3.

In some implementations, a system may support the beam training procedure 400 as a system-wide beam training occasion and the system-wide beam training occasion may be configured at various communication nodes or devices by a network entity or may be part of a pre-configuration (such as may be pre-loaded at the various communication nodes or devices). Additionally, or alternatively, the various communication nodes or devices may identify, select, determine, or otherwise implement the beam training procedure 400 in a distributed manner. For example, communication nodes (such as UEs 115) and an AN in a geographical region may negotiate resources for assisted beam training. In some aspects, the negotiation may be over broadcast or groupcast transmissions or through individual SRBs.

In some implementations, the beam training procedure 400 may include a set of FR2 beam training resources 405 and a set of training occasions 410. The set of FR2 beam training resources 405 may include or refer to any one or more of an FR2 beam training resource 405-*a*, an FR2 beam training resource 405-*b*, and an FR2 beam training resource 405-*c* and the set of FR2 beam training resources 405 may include resources over which one or more nodes or devices may transmit SSBs or sidelink beam training reference signals, among other examples. The set of training occasions 410 may include or refer to any one or more of a training occasion 410-*a*, a training occasion 410-*b*, a training occasion 410-*c*, a training occasion 410-*d*, and a training occasion 410-*e* and may be examples of semi-statically configured assisted beam training resources.

Each training occasion 410 may be equivalently referred to as a beam training occasion and each training occasion 410 may include multiple sub-occasions 415 for beam sweep (a sweeping or cycling through transmit or receive beams at communication nodes) or configuration sweep (a sweeping or cycling through configurations of assisting devices). The beam training procedure 400 illustrates eight sub-occasions 415 for each training occasion 410, but any number of sub-occasions 415 may be included in a given training occasion 410. Further, a sub-occasion 415 may refer to any sub-occasion within a training occasion 410, and the training occasion 410-*c* may specifically include a sub-occasion 415-*a* having a start time $t_0$ (shown as t_0 in FIG. 4) and a sub-occasion 415-*b* having a start time $t_1$ (shown as t_1 in FIG. 4) for illustrative and explanatory purposes.

In some implementations, each sub-occasion 415 may correspond to a fixed configuration by the assisting devices with the communication nodes performing a transmit or receive beam sweep. For example, each of the three assisting devices may maintain a constant or same configuration for a duration of a sub-occasion 415 and during that sub-occasion 415 the communication nodes may cycle or sweep through various transmit or receive beams and perform measurements for each beam pair over each of multiple measurement occasions 420 within that sub-occasion 415. In such implementations, the assisting devices may use different configurations for different sub-occasions 415.

In some other implementations, and as shown in the beam training procedure 400, each sub-occasion 415 may correspond to a fixed transmit or receive beam at the communication nodes with the assisting devices changing their configurations over each of multiple measurement occasions 420 within that sub-occasion 415. For example, during the sub-occasion 415-*a*, the first assisting device, the second assisting device, and the third assisting device may cycle or sweep through various configurations while the node A maintains a first transmit beam (such as a transmit beam associated with parameters $(\theta_1, \phi_1, z_1)$) and the node B maintains a second receive beam (such as a receive beam associated with parameters $(\theta_r, \phi_i, z_i)$). As shown in the beam training procedure 400, the first assisting device may cycle between a configuration $\alpha_1^1$, a configuration $\alpha_1^2$, and so on through to a configuration $\alpha_1^N$ during each sub-occasion 415 such that the first assisting device uses the configuration $\alpha_1^1$ for a first measurement occasion 420 of each sub-occasion 415, uses the configuration $\alpha_1^2$ for a second measurement occasion 420 of each sub-occasion 415, and uses the configuration $\alpha_1^N$ for an $N^{th}$ measurement occasion 420 of each sub-occasion 415.

Similarly, the second assisting device may cycle between a configuration $\alpha_2^1$, a configuration 4 and so on through to a configuration $\alpha_2^N$ during each sub-occasion 415 such that the second assisting device uses the configuration $\alpha_2^1$ for the first measurement occasion 420 of each sub-occasion 415, uses the configuration $\alpha_2^2$ for the second measurement occasion 420 of each sub-occasion 415, and uses the configuration $\alpha_2^N$ for the $N^{th}$ measurement occasion 420 of each sub-occasion 415. The third assisting device may cycle between a configuration $\alpha_3^1$, a configuration $\alpha_3^2$, and so on through to a configuration $\alpha_3^N$ during each sub-occasion 415 such that the third assisting device uses the configuration $\alpha_3^1$ for the first measurement occasion 420 of each sub-occasion 415, uses the configuration $\alpha_3^2$ for the second measurement occasion 420 of each sub-occasion 415, and uses the configuration $\alpha_3^N$ for the $N^{th}$ measurement occasion 420 of each sub-occasion 415. In some aspects, different configurations $\alpha_j^i$ may be referred to herein as different reflection parameter values or as different parameters for the reflection characteristic.

For further example, during the sub-occasion 415-*b*, the first assisting device, the second assisting device, and the third assisting device may cycle or sweep through (the same) various configurations across the measurement occasions 420 within the sub-occasion 415-*b* while the node A maintains a second transmit beam (such as a transmit beam associated with parameters $(\theta_2, \phi_2, z_2)$) and the node B maintains the same second receive beam (such as the receive beam associated with parameters $(\theta_i, \phi_i, z_i)$). In some aspects, the system-wide resources for the assisted beam training may be a part of the system-wide resources for beam training in mmW. In some other aspects, the system-wide resources for the assisted beam training may be in a channel separate from the system-wide resources used for beam training in mmW, and such a separate channel may occur periodically.

In some implementations, the node A and the node B attempting to establish a BPL through an assisting device may have an SRB present (such as over FR1, sub-6 GHz, FR2, or mmW) and the node A and the node B may negotiate the reference signal sequences to be used as part of the beam training procedure 400. For example, in a multi-node multi-link system, maintaining orthogonality of the training signals may be helpful for reliability and the node A and the node B may be able to maintain the orthogonality in accordance with negotiating on the reference signal sequences. Further, if more than one resource (such as more than one frequency resource) is available in a beam training occasion (such as in a training occasion 410) for a given link, the communication nodes (which may be examples of UEs 115) may negotiate (via signaling), pre-select, or pre-determine the resource (the frequency resource) that the communication nodes may use for training on that given link. As such, the nodes may be able to orthogonalize in the frequency domain as possible.

A communication node may discover, detect, or determine a presence of an assisting device in a vicinity of the communication node in various manners. In some implementations, the communication node may receive information associated with one or more assisting devices from a network entity or device. In such implementations, the communication node may receive location information associated with the one or more assisting devices, orientation information associated with the one or more assisting devices, capability information associated with the one or more assisting devices, or any combination thereof.

Additionally, or alternatively, a communication node may discover one or more assisting devices through a discovery procedure. For example, the communication node may discover the one or more assisting devices in accordance with transmitting or receiving one or more discovery signals (which may be transmitted to or received from one or more ANs controlling the one or more assisting devices). In some aspects, a communication node may have a list of associated devices with which the communication node may have an established SRN or with which the communication node is able to (in the future) establish an SRB. In some implementations, the communication node may compile or aggregate the list of associated devices in accordance with receiving the information associated with the one or more assisting devices or in accordance with a discovery procedure, or a combination thereof.

As part of the beam training procedure 400, the node A and the node B may perform measurements associated with signal strength or signal quality over the various sub-occasions 415 and may keep track of which sub-occasions 415 are associated with providing a greatest signal strength or signal quality. As such, the node A and the node B may use the measurements and the configured beam training procedure 400 to identify, select, or otherwise determine which transmit beam, which receive beam, and which configuration of which assisting device provides the node A and the node B with a suitable BPL (such as a BPL satisfying a QoS constraint or a BPL satisfying one or more signal strength or quality thresholds). Additional details relating to the selection of the assisting device and the configuration of the assisting device in accordance with the beam training procedure 400 are illustrated by and described in more detail with reference to FIG. 5.

Figure 5:
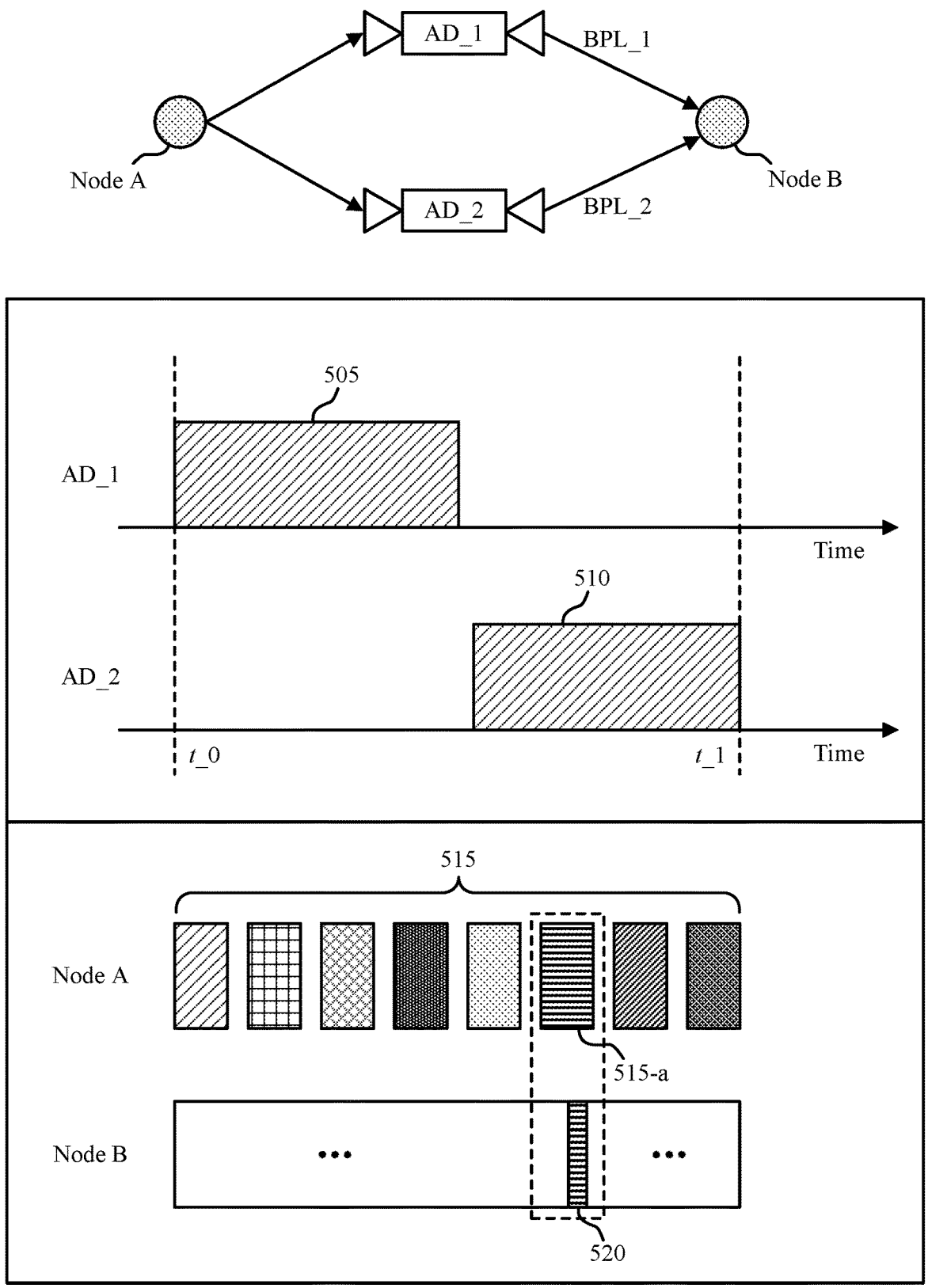
FIG. 5 shows an example selection procedure that supports techniques for establishing directional communications via a configurable reflective surface.

FIG. 5 shows an example selection procedure 500 that supports techniques for establishing directional communications via a configurable reflective surface. The selection procedure 500 may implement or be implemented to realize aspects of the wireless communications system 100, the link establishment diagram 200, the link establishment diagram 300, or the beam training procedure 400. For example, the selection procedure 500 illustrates a post-measurement assisting device selection between a first assisting device (an $AD_1$ or AD_1) and a second assisting device (an $AD_2$ or AD_2) by a node A and a node B.

The node A and the node B may be examples of the node 205-a and the node 205-b, respectively, as illustrated by and described with reference to FIG. 2, may be examples of the node 305-a and the node 305-b, respectively, as illustrated by and described with reference to FIG. 3, or may be examples of the node A and the node B, respectively, as illustrated by and described with reference to FIG. 4. The first assisting device and the second assisting device may be examples of the assisting device 215 as illustrated by and described with reference to FIG. 2, of assisting devices 315 as illustrated by and described with reference to FIG. 3, or of assisting devices as illustrated by and described with reference to FIG. 4. In some aspects, each of the first assisting device and the second assisting device may be coupled with or otherwise controlled by an AN, which may be an example of an AN 210 as illustrated by and described with reference to FIG. 2 or of ANs 310 as illustrated by and described with reference to FIG. 3.

The node A and the node B may perform a beam training procedure, such as the beam training procedure 400 as illustrated by and described with reference to FIG. 4, and, in accordance with the beam measurement, the nodes may select, identify, or otherwise determine which assisting device to form a BPL through. For example, as part of the beam training procedure, multiple assisting devices may be used in one beam training opportunity and the nodes (which may be examples of UEs 115) may be unaware of which assisting device formed a BPL associated with a greatest signal strength or signal quality (such as which assisting device formed a "best" BPL) of the multiple assisting devices used for that beam training opportunity or occasion. As an alternative to using multiple assisting devices in one beam training opportunity, the nodes may reserve multiple assisting devices and use one at a time, which may result in one or more unused assisting devices for some periods of time and a wastage of hardware resources.

In some implementations, the communication nodes may obtain a set of one or more BPLs (each including a transmit beam and a receive beam) associated with a beam training opportunity or occasion via the beam training procedure and at least one of the communication modes may transmit a request for one or multiple measurement opportunities or slots from each AN which may have provided the set one or more BPLs for the beam training opportunity or occasion. For example, a communication node may notify an AN (or multiple ANs) of one or a possible set of configurations over which a BPL associated with the greatest signal strength or signal quality may have been formed (where such a possible set of configurations may be mapped to a sub-occasion index $t_1$, $t_2$, and so on in accordance with the configured and commonly known beam training procedure).

The one or multiple measurement opportunities or slots that the communication node may request from each of the one or more ANs may be distinct in time. For example, the communication nodes may use each assisting device in a distinct time slot such that one assisting device is used in a given time slot or measurement opportunity. The time slots may include one or relatively few training resources (such as time and frequency resources) and may be shorter than a measurement beam training opportunity associated with the beam training procedure, as the communication nodes may use the time slots to verify one or relatively few BPLs over one or relatively few different assisting device configurations. At least one communication node may transmit one or more beam training reference signals or one or more CSI-RSs over the measurement opportunities or slots to measure or detect through which assisting device (or which assisting devices) the communication nodes may establish a suitable (such as a relatively most suitable or "best") BPL.

In some aspects, the communication nodes may repeat the selection procedure 500 for multiple candidate beams. For example, the node A and the node B may measure that one of a first BPL through the first assisting device or a second BPL through the second assisting device is associated with a greatest signal strength or quality in accordance with the beam training procedure and may measure that a suitable BPL occurred when the first assisting device was using a first configuration and when the second assisting device was using a second configuration (such as at least one of the communication nodes may identify or determine at which time instance or for which time duration within a sub-occasion a "best" BPL was measured).

In some implementations, the node B may identify or determine that a BPL associated with a suitable signal strength or quality is measured during an overlap of an occasion 515-a, of a set of occasions 515, associated with a first transmit beam from the node A and an occasion 520 (such as a measurement occasion 420) associated with a first receive beam from the node B and at least one of the node A or the node B may request separate (non-overlapping in the time-domain) measurement opportunities for the first assisting device using the first configuration and for the second assisting device using the second configuration. As such, for example, the node A may use the first transmit beam and the node B may use the second receive beam for each of a measurement opportunity 505 for the first assisting device and a measurement opportunity 510 for the second assisting device. In some implementations, the communication nodes may measure that a signal strength or a signal quality is greater during the measurement opportunity 505 and, accordingly, may select the first AN associated with the first BPL.

In some implementations, the communication nodes (such as one or both of the node A and the node B) may monitor BPLs periodically. For example, during a beam training procedure, the node A and the node B may measure or otherwise determine that K possible BPLs through one or more assisting devices may achieve a target or threshold QoS. Among the K possible BPLs, the node A and the node B may select one for current or upcoming communication (such as the BPL associated with the greatest signal strength or quality). As such, at least one of the node A and the node B may store information associated with the remaining K−1 possible BPLs that the node A and the node B established through one or more assisting devices. In other words, the node A or the node B, or both, may store a "best" K−1 BPLs, such as BPLs associated with providing a greatest signal strength or quality relative to a remainder of possible BPLs or BPLs associated with a signal strength or quality greater than a threshold signal strength or quality. The node A or the node B, or both, may store the K−1 BPLs and may not actively use any of the K−1 BPLs for a data radio bearer (DRB), but may select to use or may need to use at least one of the K−1 BPLs in the future (such as if a current DRB BPL deteriorates).

To monitor the K−1 BPLs stored by the node A or the node B, or both, one of the node A and the node B may (after beam training and assisting device selection) transmit a request to an AN to support the monitoring of the K−1 BPLs. The request may include a measurement periodicity, one or more possible measurement slots, or an indication of which reference signals may be used over the possible measurement slots, or any combination thereof. The AN may receive the request and may accept the request (and support the requested measurement periodicity, measurement slots, or reference signals) or reject the request. Additionally, or alternatively, the AN may transmit, to the node from which the request was received, an update request. Such an update request may include information associated with a modified measurement periodicity, one or more different possible measurement slots, or an indication of different reference signals, or any combination thereof, relative to the request that the AN received.

In addition, or as an alternative, to transmit such a request to an AN, the node A or the node B, or both, may periodically reserve an assisting device through an associated AN (an AN controlling the assisting device) for beam measurement. In some aspects, a measurement period that the node A or the node B, or both, reserve at the assisting device may be relatively short, as the node A or the node B may measure one or relatively few BPLs during the measurement period.

In implementations involving either or both of such a request or such a reservation, the node A or the node B, or both, may perform the measurements associated with the different BPLs (the K−1 BPLs) over various resources. In some aspects, the node A or the node B, or both, may perform the measurements over semi-statically configured resources or slots (such as semi-statically configured resources or slots as illustrated by FIG. 4). Additionally, or alternatively, the node A or the node B, or both, may perform the measurements over resources that are multiplexed with a shared channel, such as a physical downlink shared channel (PDSCH), a physical uplink shared channel (PUSCH), or a physical sidelink shared channel (PSSCH).

Figure 6:
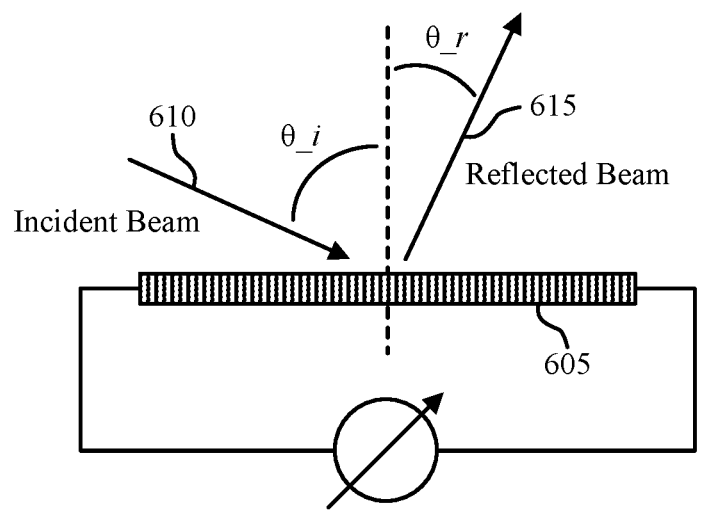
FIG. 6 shows an example assisting device that supports techniques for establishing directional communications via a configurable reflective surface.

FIG. 6 shows an example assisting device 600 that supports techniques for establishing directional communications via a configurable reflective surface. The assisting device 600 may implement or be implemented to realize aspects of the wireless communications system 100, the link establishment diagram 200, the link establishment diagram 300, the beam training procedure 400, or the selection procedure 500. For example, the assisting device 600 may be an example of an assisting device 215 as illustrated by and described with reference to FIG. 2, assisting devices 315 as illustrated by and described with reference to FIG. 3, or assisting devices as illustrated by and described with reference to FIGS. 4 and 5.

In some aspects, the assisting device 600 may include a configurable reflective surface 605 (such as an RIS) and the configurable reflective surface 605 may be associated with a configurable reflection characteristic. For example, the configurable reflective surface 605 may be a passive reflector that is capable of influencing how wireless signaling reflects off of the configurable reflective surface 605 via different configurations of the reflection characteristic. An AN may control the reflection characteristic of the configurable reflective surface 605 via wireless signaling (if the AN is non-co-located with the assisting device 600) or via an electronic or fiber optic coupling between the AN and the configurable reflective surface 605 (if the AN is co-located with the assisting device 600). In some aspects, the AN may control the configurable reflective surface 605 via one or more electrical pulses or via an electrical current.

The AN may control the reflection characteristic of the configurable reflective surface 605 in accordance with adjusting one or more phase shifters and weights of the configurable reflective surface 605 to reflect an incident beam 610 (an incident wave) in a desired or suitable direction for a reflected beam 615 (a reflected wave). In other words, the reflection characteristic of the configurable reflective surface 605 may dictate or influence how signals reflect off of the configurable reflective surface 605. For example, the AN may control the reflection characteristic of the configurable reflective surface 605 such that an incident beam 610, associated with an angle $\theta_i$, is reflected as a reflected beam 615 (which may illustrate a reflection of the signaling or waveform of the incident beam 610), associated with an angle $\theta_r$, which may or may not be different than the angle $\theta_i$.

Figure 7:
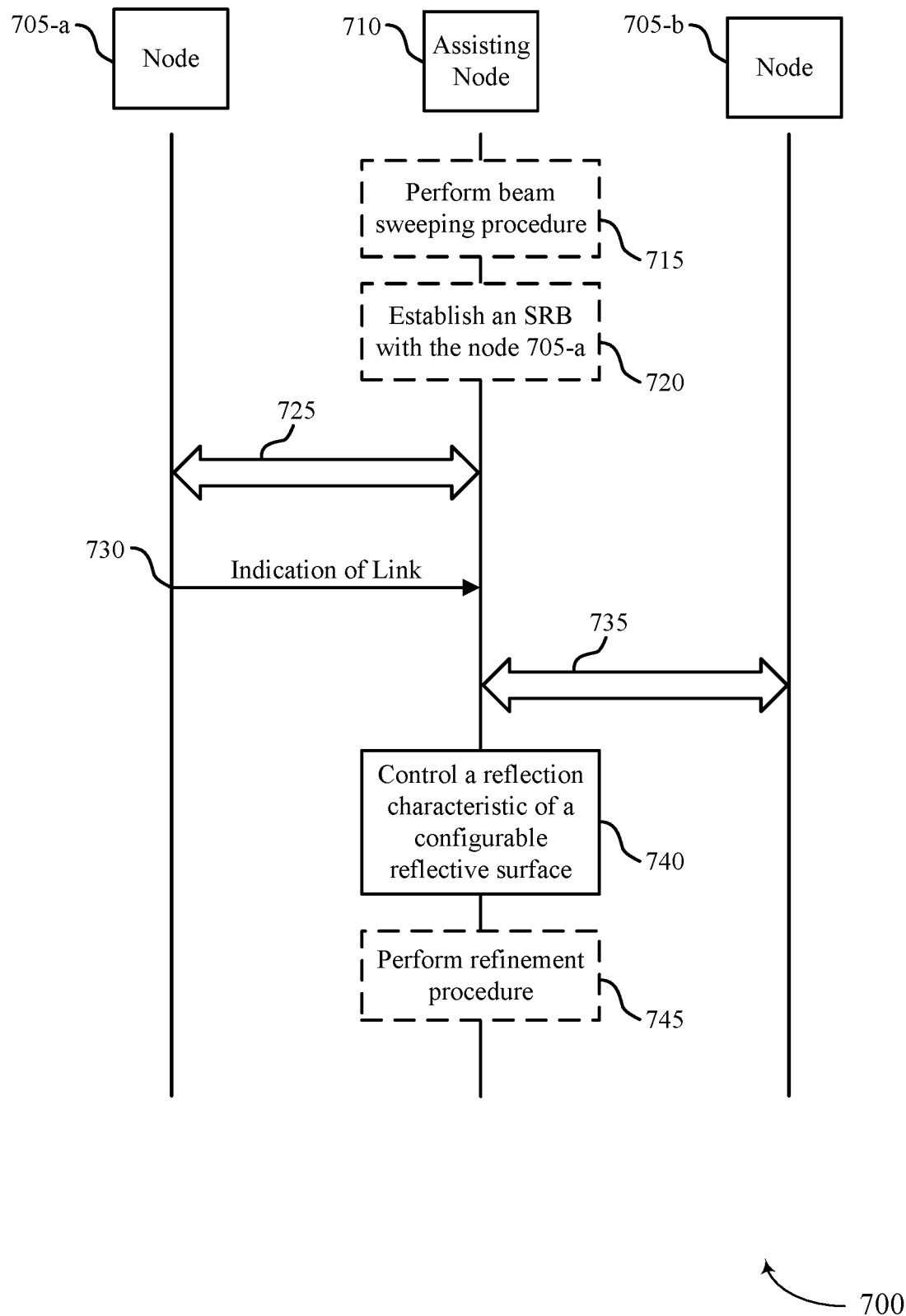
FIGS. 7 and 8 show example process flows that support techniques for establishing directional communications via a configurable reflective surface.

FIG. 7 shows an example process flow 700 that supports techniques for establishing directional communications via a configurable reflective surface. The process flow 700 may implement or be implemented to realize one or more aspects of the wireless communications system 100, the link establishment diagram 200, the link establishment diagram 300, the beam training procedure 400, the selection procedure 500, or the assisting device 600. For example, the process flow 700 illustrates communication between a node 705-*a*, a node 705-*b*, and an AN 710.

The node 705-*a* and the node 705-*b* may be examples of the node 205-*a* and the node 205-*b*, respectively, as illustrated by and described with reference to FIG. 2, may be examples of the node 305-*a* and the node 305-*b*, respectively, as illustrated by and described with reference to FIG. 3, or may be examples of the node A and the node B, respectively, as illustrated by and described with reference to FIGS. 4 and 5. The AN 710 may be an example of the AN 210 as illustrated by and described with reference to FIG. 2 or of ANs 310 as illustrated by and described with reference to FIG. 3.

In the following description of the process flow 700, the operations may be performed (such as reported or provided) in a different order than the order shown, or the operations performed by the example devices may be performed in different orders or at different times. Some operations also may be omitted from the process flow 700, or other operations may be added to the process flow 700. Further, although some operations or signaling may be shown to occur at different times for discussion purposes, these operations may actually occur at the same time or otherwise concurrently.

At 715, the AN 710 may perform a beam sweeping procedure. In some implementations, the AN 710 may perform the beam sweeping procedure as part of a connection establishment with one or both of the node 705-a and the node 705-b. In some implementations, the AN 710 may perform the beam sweeping procedure using a first RF band (such as an FR1 or a sub-6 GHz band) to establish a parameter or configuration for directional reception of signals from the node 705-a. Additionally, or alternatively, the AN 710 may perform a beam sweeping procedure to establish a parameter or configuration for directional transmission of signals to the node 705-b. Such parameters may include or be associated with beamforming directions, beam weight sets, beam indices or identifiers, antenna ports, or any other parameters or configuration that supports a determination or inference of a direction or range of directions between the AN 710 and either the node 705-a or the node 705-b.

At 720, the AN 710 may establish an SRB with the node 705-a. In some implementations, such as in implementations in which the AN 710 establishes the parameter or configuration for directional reception of signals from the node 705-a using the first RF band (such as the FR1 or sub-6 GHz band), the AN 710 may establish the SRB with the node 705-a using a second RF band (such as an FR2 or mmW band). In such implementations, the node 705-a may initiate a beam training procedure with the AN 710 to form an FR2 or mmW link. Additionally, or alternatively, the AN 710 may transmit one or more synchronization signals periodically and the AN 710 and the node 705-a may establish the SRB in accordance with the synchronization signals. In some other implementations, the AN 710 may establish an SRB with the node 705-a using a first RF band (such as an FR2 or mmW band) and, in such implementations, the AN may use a same parameter for directional reception as used for establishing the SRB with the node 705-a.

At 725, the AN 710 may communicate with the node 705-a in accordance with the parameter for directional reception from the node 705-a. For example, the AN 710 may establish a communication link with the node 705-a and may use a receive beam to receive signaling from the node 705-a. As such, a parameter or configuration for directional reception may correspond to or may otherwise be associated with a directional communication beam.

At 730, the AN 710 may receive, from the node 705-a, an indication associated with a link establishment between the node 705-a and the node 705-b. In some aspects, the node 705-a may transmit the indication associated with the link establishment between the node 705-a and the node 705-b in accordance with measuring, detecting, or otherwise determining that the node 705-a and the node 705-b are unable to establish a BPL (such as an FR2 or mmW BPL).

At 735, the AN 710 may communicate with the node 705-b in accordance with a parameter for directional transmission of signals to the node 705-b. For example, the AN 710 may establish a communication link with the node 705-b and may use a transmit beam to transmit signaling to the node 705-b. In some implementations, the AN 710 may establish the communication link with the node 705-b in accordance with receiving the indication associated with the link establishment between the node 705-a and the node 705-b at 730.

At 740, the AN 710 may control a reflection characteristic of a configurable reflective surface in accordance with the parameter for directional reception of signals from the node 705-a and the parameter for directional transmission of signals to the node 705-b. In some implementations, the AN may control the reflection characteristic of the configurable reflective surface for transmissions from the node 705-a to the node 705-b in accordance with a direction of incident signaling that is associated with the parameter for direction reception of signals from the node 705-b and in accordance with a direction (such as a desired direction) of reflected signaling that is associated with the parameter for directional transmission of signals the node 705-b. Additionally, or alternatively, the AN 710 may control the reflection characteristic of the configurable reflective surface for transmissions from the node 705-b to the node 705-a in accordance with a direction of incident signaling that is associated with the parameter for directional transmission of signals to the node 705-b and in accordance with a direction of reflected signaling that is associated with the parameter for directional reception of signals from the node 705-a.

In some aspects, the AN 710 may select, from a lookup resource stored at the AN 710, a parameter for the reflection characteristic of the configurable reflective surface. In some implementations, the AN 710 may transmit, to an apparatus that includes the configurable reflective surface, wireless signaling associated with the controlling of the reflection characteristic of the configurable reflective surface. In some other implementations, the AN 710 may control the configurable reflective surface via an electronic or fiber optic coupling between the AN 710 and the configurable reflective surface.

At 745, the AN 710 may perform a refinement procedure associated with the reflection characteristic of the configurable reflective surface based on or associated with a detected condition satisfying a threshold. In some implementations, the AN 710 may transmit, to the node 705-a and the node 705-b, an indication of a set of parameters for the reflection characteristic of the configurable reflective surface and may cycle the reflection characteristic of the configurable reflective surface between the set of parameters for the reflection characteristic over a set of multiple training occasions. In some aspects, the detected condition satisfying the threshold may include a measured signal quality or an availability of multiple parameters for the reflection characteristic of the configurable reflective surface.

Figure 8:
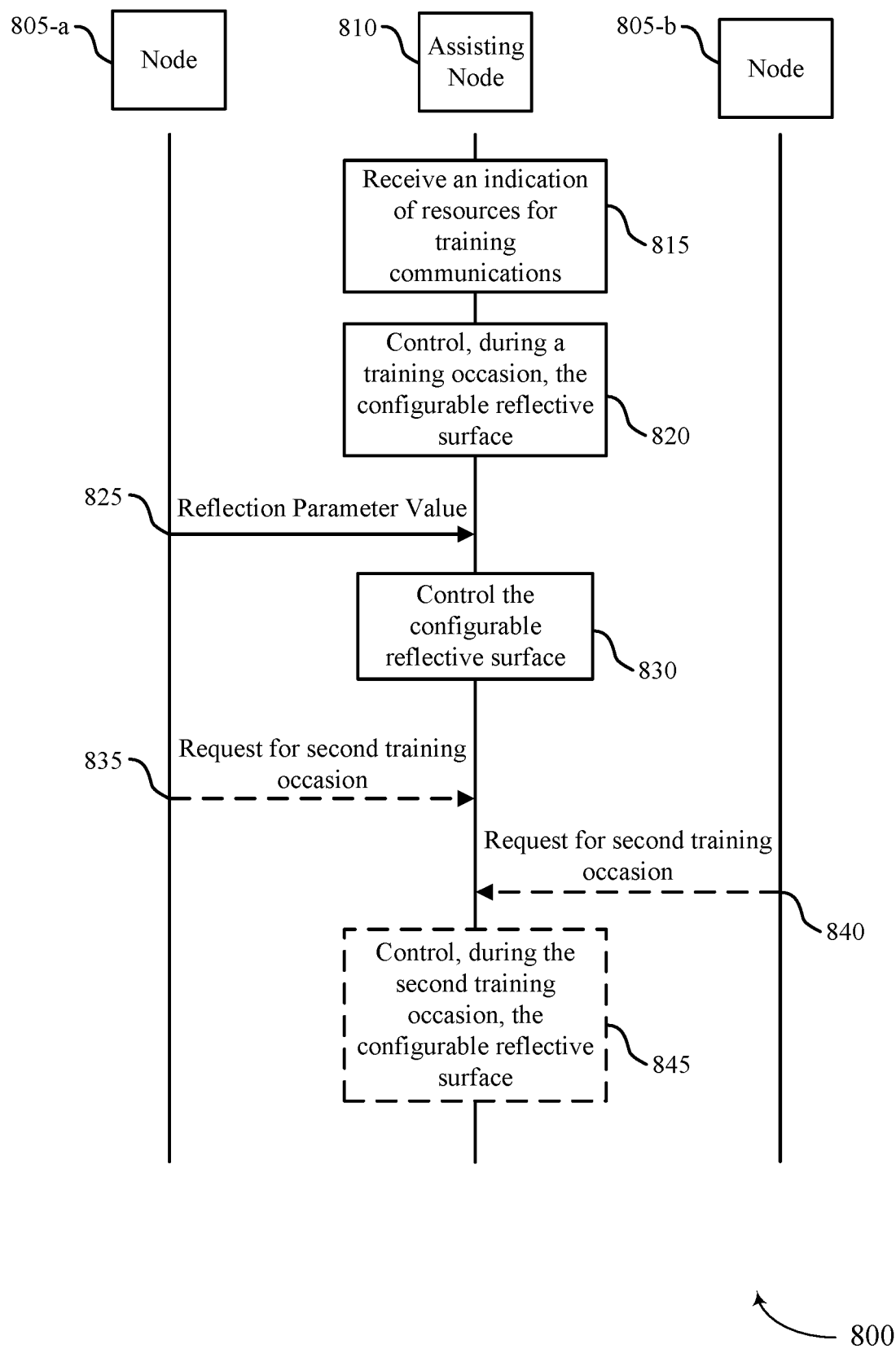

FIG. 8 shows an example process flow 800 that supports techniques for establishing directional communications via a configurable reflective surface. The process flow 800 may implement or be implemented to realize one or more aspects of the wireless communications system 100, the link establishment diagram 200, the link establishment diagram 300, the beam training procedure 400, the selection procedure 500, the assisting device 600 or the process flow 700. For example, the process flow 800 illustrates communication between a node 805-a, a node 805-b, and an AN 810.

The node 805-a and the node 805-b may be examples of the node 205-a and the node 205-b, respectively, as illustrated by and described with reference to FIG. 2, may be examples of the node 305-a and the node 305-b, respectively, as illustrated by and described with reference to FIG. 3, may be examples of the node A and the node B, respectively, as illustrated by and described with reference to FIGS. 4 and 5, or may be examples of the node 705-a and the node 705-b, respectively, as illustrated by and described with reference to FIG. 7. The AN 810 may be an example of the AN 210 as illustrated by and described with reference to FIG. 2, of ANs 310 as illustrated by and described with reference to FIG. 3, or of the AN 710 as illustrated by and described with reference to FIG. 7.

In the following description of the process flow 800, the operations may be performed (such as reported or provided) in a different order than the order shown, or the operations performed by the example devices may be performed in different orders or at different times. Some operations also may be omitted from the process flow 800, or other operations may be added to the process flow 800. Further, although some operations or signaling may be shown to occur at different times for discussion purposes, these operations may actually occur at the same time or otherwise concurrently.

At 815, the AN 810 may receive an indication of resources for training communications via a configurable reflective surface, the resources associated with training occasions each including a set of sub-occasions, each sub-occasion including a set of multiple measurement occasions.

At 820, the AN 810 may control, during a training occasion, the configurable reflective surface in accordance with a respective reflection parameter value of multiple reflection parameter values for each measurement occasion of the set of multiple measurement occasions associated with the training occasion.

At 825, the AN 810 may receive, from the node 805-a, an indication of one of the multiple reflection parameter values. In some aspects, the AN 810 may receive an indication of a sub-occasion from the set of multiple sub-occasions or may receive an indication of one of the measurement occasions from the set of multiple measurement occasions.

At 830, the AN 810 may control, for communications between the node 805-a and the node 805-b, the configurable reflective surface in accordance with the indication one of the multiple reflection parameter values.

At 835, the AN 810 may receive, after the training occasion, a request from the node 805-a to initiate a second training occasion.

At 840, the AN 810 may receive, after the training occasion, a request from the node 805-b to initiate a second training occasion. In some implementations, the AN 810 may receive the request to initiate the second training occasion from one of the node 805-a or the node 805-b (and not both). In some other implementations, the AN 810 may receive the request from both the node 805-a and the node 805-b.

At 845, the AN 810 may control, for the second training occasion, the configurable reflective surface in accordance with a respective reflection parameter value of a subset of the reflection parameter values for each measurement occasion of the multiple measurement occasions associated with the second training occasion.

Figure 9:
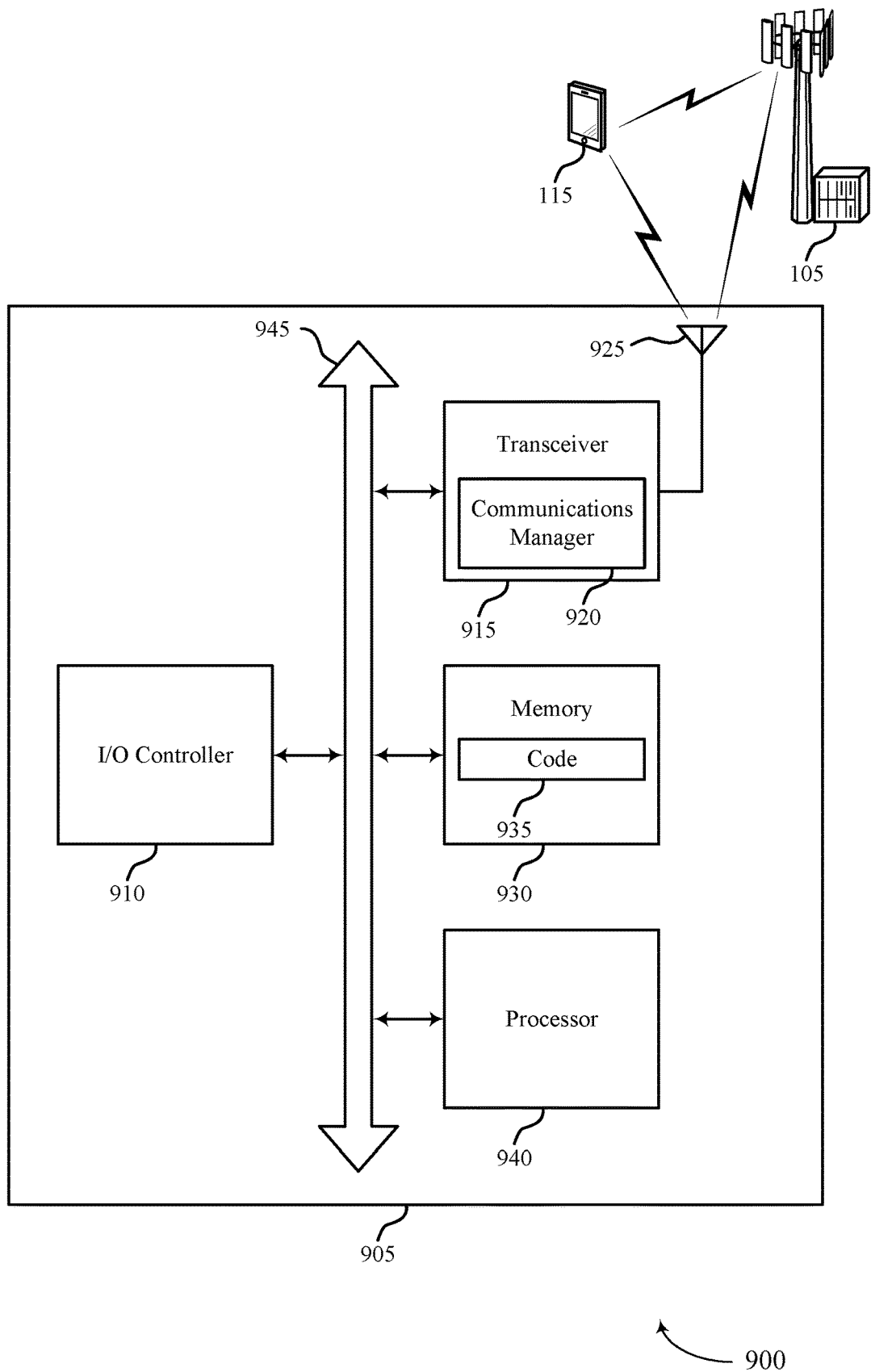
FIGS. 9 and 10 show block diagrams of example devices that support techniques for establishing directional communications via a configurable reflective surface.

FIG. 9 shows a block diagram 900 of an example device 905 that supports techniques for establishing directional communications via a configurable reflective surface. The device 905 may be an example of a node, a terminal, or a UE 115. The device 905 may communicate wirelessly with one or more BSs 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (such as operatively, communicatively, functionally, electronically, electrically) via one or more buses (such as a bus 945).

The I/O controller 910 may manage input and output signals for the device 905. The I/O controller 910 also may manage peripherals not integrated into the device 905. In some implementations, the I/O controller 910 may represent a physical connection or port to an external peripheral. In some implementations, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some implementations, the I/O controller 910 may be implemented as part of a processor or processing system, such as the processor 940. In some implementations, a user may interact with the device 905 via the I/O controller 910 or via hardware components controlled by the I/O controller 910.

In some implementations, the device 905 may include a single antenna 925. However, in some other implementations, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925.

In some implementations, the transceiver 915 may include one or more interfaces, such as one or more interfaces coupled with the one or more antennas 925 that are configured to support various receiving or obtaining operations, or one or more interfaces coupled with the one or more antennas 925 that are configured to support various transmitting or outputting operations, or a combination thereof. In some implementations, the transceiver 915 may include or be configured for coupling with one or more processors or memory components that are operable to perform or support operations associated with received or obtained information or signals, or to generate information or other signals for transmission or other outputting, or any combination thereof. In some implementations, the transceiver 915, or the transceiver 915 and the one or more antennas 925, or the transceiver 915 and the one or more antennas 925 and one or more processors or memory components (such as the processor 940, or the memory 930, or both), may be included in a chip or chip assembly that is installed in the device 905.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some implementations, the code 935 may not be directly executable by the processor 940 but may cause a computer (such as when compiled and executed) to perform functions described herein. In some implementations, the memory 930 may contain, among other things, a basic I/O system (BIOS)

which may control basic hardware or software operation such as the interaction with peripheral components or devices.

The processor 940 may be any one or more suitable processors capable of executing scripts or instructions of one or more software programs stored in the device 905 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 940, or the transceiver 915, or the communications manager 920, or other components or combinations of components of the device 905.

The processing system of the device 905 may interface with other components of the device 905, and may process information received from other components (such as inputs or signals) or output information to other components. For example, a chip or modem of the device 905 may include a processing system, a first interface to output information, and a second interface to obtain information. In some implementations, the first interface may refer to an interface between the processing system of the chip or modem and a transmitter, such that the device 905 may transmit information output from the chip or modem. In some implementations, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs.

The communications manager 920 may support wireless communication at an AN in accordance with examples as disclosed herein. For example, the communications manager 920 may be configured as or otherwise support a means for communicating with a first node in accordance with a parameter for directional reception of signals from the first node. The communications manager 920 may be configured as or otherwise support a means for communicating with a second node in accordance with a parameter for directional transmission of signals to the second node. The communications manager 920 may be configured as or otherwise support a means for controlling a reflection characteristic of a configurable reflective surface in accordance with the parameter for directional reception of signals from the first node and the parameter for directional transmission of signals to the second node.

In some implementations, to support controlling the reflection characteristic of the configurable reflective surface, the communications manager 920 may be configured as or otherwise support a means for controlling, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

In some implementations, to support controlling the reflection characteristic of the configurable reflective surface, the communications manager 920 may be configured as or otherwise support a means for controlling, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

In some implementations, to support controlling the reflection characteristic of the configurable reflective surface, the communications manager 920 may be configured as or otherwise support a means for selecting, from a lookup resource stored at the AN, a parameter for the reflection characteristic of the configurable reflective surface that is associated with the parameter for directional reception of signals from the first node and the parameter for directional transmission of signals to the second node. In some implementations, to support controlling the reflection characteristic of the configurable reflective surface, the communications manager 920 may be configured as or otherwise support a means for controlling the reflection characteristic of the configurable reflective surface in accordance with the selected parameter.

In some implementations, the communications manager 920 may be configured as or otherwise support a means for receiving, from the first node, an indication associated with a link establishment between the first node and the second node, where communicating with the second node in accordance with the parameter for directional transmission of signals to the second node is associated with receiving the indication.

In some implementations, the communications manager 920 may be configured as or otherwise support a means for performing a beam sweeping procedure using a first RF band to establish the parameter for directional reception of signals from the first node, where communicating with the first node in accordance with the parameter for directional reception of signals from the first node is associated with performing the beam sweeping procedure.

In some implementations, the communications manager 920 may be configured as or otherwise support a means for establishing an SRB with the first node using a second RF band, where performing the beam sweeping procedure using the first RF band is associated with the establishing of the SRB with the first node using the second RF band.

In some implementations, the communications manager 920 may be configured as or otherwise support a means for establishing an SRB with the first node using a first RF band. In some implementations, the communications manager 920 may be configured as or otherwise support a means for using a same parameter for directional reception as used for establishing the SRB with the first node using the first RF band to establish the parameter for directional reception of signals from the first node, where communicating with the first node in accordance with the parameter for directional reception of signals from the first node is associated with using the same parameter for directional reception.

In some implementations, the communications manager 920 may be configured as or otherwise support a means for switching from communicating with the first node in accordance with the parameter for directional reception of signals from the first node to communicating with the first node in accordance with a second parameter for directional reception of signals from the first node. In some implementations, the communications manager 920 may be configured as or otherwise support a means for controlling the reflection characteristic of the configurable reflective surface in accordance with the second parameter for directional reception of signals from the first node.

In some implementations, the communications manager 920 may be configured as or otherwise support a means for switching from communicating with the second node in accordance with the parameter for directional transmission of signals to the second node to communicating with the second node in accordance with a second parameter for directional transmission of signals to the second node. In some implementations, the communications manager 920 may be configured as or otherwise support a means for controlling the reflection characteristic of the configurable reflective surface in accordance with the second parameter for directional transmission of signals to the second node.

In some implementations, the communications manager 920 may be configured as or otherwise support a means for switching from communicating with the first node in accordance with the parameter for directional reception of signals from the first node to communicating with the first node in accordance with a second parameter for directional reception of signals from the first node. In some implementations, the communications manager 920 may be configured as or otherwise support a means for transmitting, to the second node, an indication associated with a status of signal propagation via the configurable reflective surface associated with the switching.

In some implementations, the communications manager 920 may be configured as or otherwise support a means for performing a refinement procedure associated with the reflection characteristic of the configurable reflective surface based on a detected condition satisfying a threshold.

In some implementations, to support performing the refinement procedure, the communications manager 920 may be configured as or otherwise support a means for transmitting, to the first node and the second node, an indication of a set of parameters for the reflection characteristic of the configurable reflective surface. In some implementations, to support performing the refinement procedure, the communications manager 920 may be configured as or otherwise support a means for cycling the reflection characteristic of the configurable reflective surface between the set of parameters for the reflection characteristic over a set of multiple training occasions. In some implementations, to support performing the refinement procedure, the communications manager 920 may be configured as or otherwise support a means for receiving, from at least one of the first node or the second node, a message indicating a parameter of the set of parameters. In some implementations, to support performing the refinement procedure, the communications manager 920 may be configured as or otherwise support a means for controlling the reflection characteristic of the configurable reflective surface in accordance with the indicated parameter.

In some implementations, to support receiving the message indicating the parameter of the set of parameters, the communications manager 920 may be configured as or otherwise support a means for receiving a measurement report indicating a signal strength associated with signaling during each training occasion of the set of multiple training occasions, the indicated parameter being associated with a training occasion of the set of multiple training occasions associated with a highest indicated signal strength. In some implementations, to support receiving the message indicating the parameter of the set of parameters, the communications manager 920 may be configured as or otherwise support a means for receiving an indication of the training occasion of the set of multiple training occasions.

In some implementations, the detected condition includes at least one of a measured signal quality associated with at least one of the communicating with the first node in accordance with the parameter for directional reception of signals from the first node or the communicating with the second node in accordance with the parameter for directional transmission of signals to the second node or an availability of multiple parameters for the reflection characteristic of the configurable reflective surface in accordance with the parameter for directional reception of signals from the first node and the parameter for directional transmission of signals to the second node.

In some implementations, the communications manager 920 may be configured as or otherwise support a means for transmitting a discovery signal associated with the AN and the configurable reflective surface, where communicating with the first node in accordance with the parameter for directional reception of signals from the first node and communicating with the second node in accordance with the parameter for directional transmission of signals to the second node is associated with transmitting the discovery signal.

In some implementations, to support controlling the reflection characteristic of the configurable reflective surface, the communications manager 920 may be configured as or otherwise support a means for transmitting, to an apparatus that includes the configurable reflective surface, wireless signaling associated with the controlling of the reflection characteristic of the configurable reflective surface.

In some implementations, to support controlling the reflection characteristic of the configurable reflective surface, the communications manager 920 may be configured as or otherwise support a means for controlling the configurable reflective surface via an electronic or fiber optic coupling between the AN and the configurable reflective surface.

Additionally, or alternatively, the communications manager 920 may support wireless communication at an AN in accordance with examples as disclosed herein. For example, the communications manager 920 may be configured as or otherwise support a means for receiving an indication of resources for training communications via a configurable reflective surface, the resources associated with training occasions, where each training occasion includes a set of multiple sub-occasions and where each sub-occasion includes a set of multiple measurement occasions. The communications manager 920 may be configured as or otherwise support a means for controlling, during a training occasion, the configurable reflective surface in accordance with a respective reflection parameter value of a set of multiple reflection parameter values for each measurement occasion of the set of multiple measurement occasions associated with the respective training occasion. The communications manager 920 may be configured as or otherwise support a means for receiving, from a first node, an indication of one of the set of multiple reflection parameter values. The communications manager 920 may be configured as or otherwise support a means for controlling, for communications between the first node and a second node, the configurable reflective surface in accordance with the indicated one of the set of multiple reflection parameter values.

In some implementations, each sub-occasion of the training occasion is associated with a corresponding reflection parameter value of the set of multiple reflection parameter values. In some implementations, receiving the indication of one of the set of multiple reflection parameter values includes receiving an indication of one of the sub-occasions from the set of multiple sub-occasions.

In some implementations, each measurement occasion of each sub-occasion of the training is associated with a corresponding reflection parameter value of the set of multiple reflection parameter values. In some implementations, receiving the indication of one of the set of multiple reflection parameter values includes receiving an indication of one of the measurement occasions from the set of multiple measurement occasions.

In some implementations, the communications manager 920 may be configured as or otherwise support a means for receiving, after the training occasion, a request from the first node or from the second node to initiate a second training occasion. In some implementations, the communications manager 920 may be configured as or otherwise support a means for controlling, for the second training occasion, the configurable reflective surface in accordance with a respective reflection parameter value of a subset of the set of multiple reflection parameter values for each measurement occasion of the set of multiple measurement occasions associated with the second training occasion.

Additionally, or alternatively, the communications manager 920 may support wireless communication at a first node in accordance with examples as disclosed herein. For example, the communications manager 920 may be configured as or otherwise support a means for receiving an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface. The communications manager 920 may be configured as or otherwise support a means for monitoring, during a training occasion, for signaling from a second node via the configurable reflective surface in accordance with a respective parameter for directional reception at the first node for each measurement occasion of the set of multiple measurement occasions associated with the training occasion. The communications manager 920 may be configured as or otherwise support a means for transmitting an indication of one of the measurement occasions from the set of multiple measurement occasions and an indication of one of the sub-occasions from the set of multiple sub-occasions.

In some implementations, the communications manager 920 may be configured to perform various operations (such as receiving, monitoring, transmitting) using or otherwise in cooperation with the transceiver 915, the one or more antennas 925, or any combination thereof. Although the communications manager 920 is illustrated as a separate component, in some implementations, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for establishing directional communications via a configurable reflective surface as described herein, or the processor 940 and the memory 930 may be otherwise configured to perform or support such operations.

Figure 10:
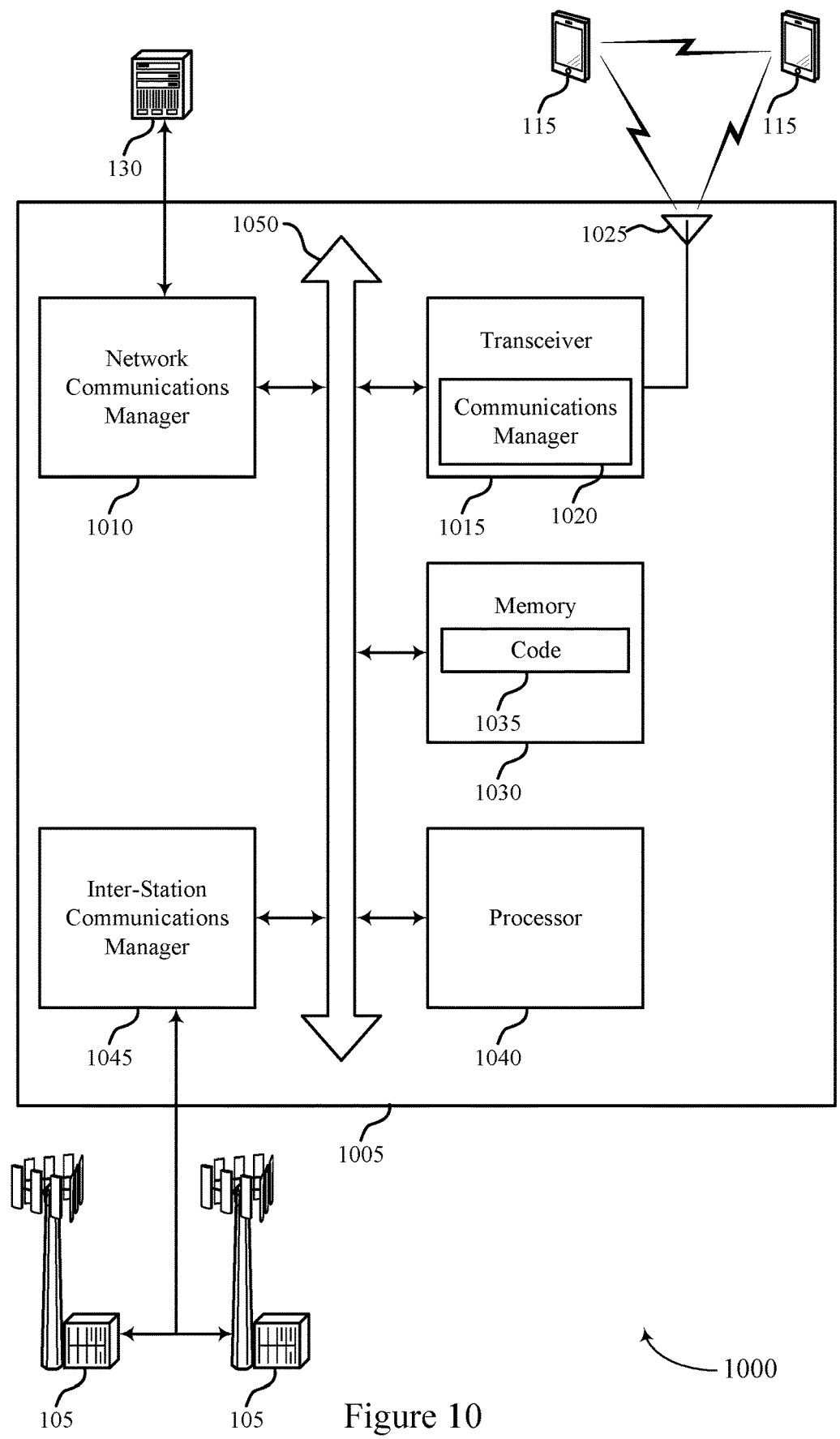

FIG. 10 shows a block diagram 1000 of an example device 1005 that supports techniques for establishing directional communications via a configurable reflective surface. The device 1005 may be an example of a network entity or one or more components of BS 105. The device 1005 may communicate wirelessly with one or more BSs 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (such as operatively, communicatively, functionally, electronically, electrically) via one or more buses (such as a bus 1050).

The network communications manager 1010 may manage communications with a core network 130 (such as via one or more wired backhaul links). For example, the network communications manager 1010 may manage the transfer of data communications for client devices, such as one or more UEs 115.

In some implementations, the device 1005 may include a single antenna 1025. However, in some other implementations, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 also may include a modem to modulate the packets, to provide the modulated packets to one or more antennas 1025 for transmission, and to demodulate packets received from the one or more antennas 1025.

In some implementations, the transceiver 1015 may include one or more interfaces, such as one or more interfaces coupled with the one or more antennas 1025 that are configured to support various receiving or obtaining operations, or one or more interfaces coupled with the one or more antennas 1025 that are configured to support various transmitting or outputting operations, or a combination thereof. In some implementations, the transceiver 1015 may include or be configured for coupling with one or more processors or memory components that are operable to perform or support operations associated with received or obtained information or signals, or to generate information or other signals for transmission or other outputting, or any combination thereof. In some implementations, the transceiver 1015, or the transceiver 1015 and the one or more antennas 1025, or the transceiver 1015 and the one or more antennas 1025 and one or more processors or memory components (such as the processor 1040, or the memory 1030, or both), may be included in a chip or chip assembly that is installed in the device 1005.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some implementations, the code 1035 may not be directly executable by the processor 1040 but may cause a computer (such as when compiled and executed) to perform functions described herein. In some implementations, the memory 1030 may contain, among other things, a BIOS which may control basic hardware or software operation such as the interaction with peripheral components or devices.

The processor 1040 may be any one or more suitable processors capable of executing scripts or instructions of one or more software programs stored in the device 1005 (such as within the memory 1030). In some implementations, the processor 1040 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1040, or the transceiver 1015, or the communications manager 1020, or other components or combinations of components of the device 1005.

The processing system of the device 1005 may interface with other components of the device 1005, and may process information received from other components (such as inputs or signals) or output information to other components. For example, a chip or modem of the device 1005 may include a processing system, a first interface to output information, and a second interface to obtain information. In some implementations, the first interface may refer to an interface between the processing system of the chip or modem and a transmitter, such that the device 1005 may transmit information output from the chip or modem. In some implementations, the second interface may refer to an interface between the processing system of the chip or modem and a receiver, such that the device 1005 may obtain information or signal inputs, and the information may be passed to the processing system. A person having ordinary skill in the art will readily recognize that the first interface also may obtain information or signal inputs, and the second interface also may output information or signal outputs.

The inter-station communications manager 1045 may manage communications with other BSs 105, and may include a controller or scheduler for controlling communications with UEs 115 in cooperation with other BSs 105. For example, the inter-station communications manager 1045 may coordinate scheduling for transmissions to UEs 115 for various interference mitigation techniques such as beamforming or joint transmission. In some implementations, the inter-station communications manager 1045 may provide an X2 interface within an LTE/LTE-A wireless communications network technology to provide communication between BSs 105.

The communications manager 1020 may support wireless communication at an AN in accordance with examples as disclosed herein. For example, the communications manager 1020 may be configured as or otherwise support a means for communicating with a first node in accordance with a parameter for directional reception of signals from the first node. The communications manager 1020 may be configured as or otherwise support a means for communicating with a second node in accordance with a parameter for directional transmission of signals to the second node. The communications manager 1020 may be configured as or otherwise support a means for controlling a reflection characteristic of a configurable reflective surface in accordance with the parameter for directional reception of signals from the first node and the parameter for directional transmission of signals to the second node.

In some implementations, to support controlling the reflection characteristic of the configurable reflective surface, the communications manager 1020 may be configured as or otherwise support a means for controlling, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

In some implementations, to support controlling the reflection characteristic of the configurable reflective surface, the communications manager 1020 may be configured as or otherwise support a means for controlling, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

In some implementations, to support controlling the reflection characteristic of the configurable reflective surface, the communications manager 1020 may be configured as or otherwise support a means for selecting, from a lookup resource stored at the AN, a parameter for the reflection characteristic of the configurable reflective surface that is associated with the parameter for directional reception of signals from the first node and the parameter for directional transmission of signals to the second node. In some implementations, to support controlling the reflection characteristic of the configurable reflective surface, the communications manager 1020 may be configured as or otherwise support a means for controlling the reflection characteristic of the configurable reflective surface in accordance with the selected parameter.

In some implementations, the communications manager 1020 may be configured as or otherwise support a means for receiving, from the first node, an indication associated with a link establishment between the first node and the second node, where communicating with the second node in accordance with the parameter for directional transmission of signals to the second node is associated with receiving the indication.

In some implementations, the communications manager 1020 may be configured as or otherwise support a means for performing a beam sweeping procedure using a first RF band to establish the parameter for directional reception of signals from the first node, where communicating with the first node in accordance with the parameter for directional reception of signals from the first node is associated with performing the beam sweeping procedure.

In some implementations, the communications manager 1020 may be configured as or otherwise support a means for establishing an SRB with the first node using a second RF band, where performing the beam sweeping procedure using the first RF band is associated with the establishing of the SRB with the first node using the second RF band.

In some implementations, the communications manager 1020 may be configured as or otherwise support a means for establishing an SRB with the first node using a first RF band. In some implementations, the communications manager 1020 may be configured as or otherwise support a means for using a same parameter for directional reception as used for establishing the SRB with the first node using the first RF band to establish the parameter for directional reception of signals from the first node, where communicating with the first node in accordance with the parameter for directional reception of signals from the first node is associated with using the same parameter for directional reception.

In some implementations, the communications manager 1020 may be configured as or otherwise support a means for switching from communicating with the first node in accordance with the parameter for directional reception of signals from the first node to communicating with the first node in accordance with a second parameter for directional reception of signals from the first node. In some implementations, the communications manager 1020 may be configured as or otherwise support a means for controlling the reflection characteristic of the configurable reflective surface in accordance with the second parameter for directional reception of signals from the first node.

In some implementations, the communications manager 1020 may be configured as or otherwise support a means for switching from communicating with the second node in accordance with the parameter for directional transmission of signals to the second node to communicating with the second node in accordance with a second parameter for directional transmission of signals to the second node. In some implementations, the communications manager 1020 may be configured as or otherwise support a means for controlling the reflection characteristic of the configurable reflective surface in accordance with the second parameter for directional transmission of signals to the second node.

In some implementations, the communications manager 1020 may be configured as or otherwise support a means for switching from communicating with the first node in accordance with the parameter for directional reception of signals from the first node to communicating with the first node in accordance with a second parameter for directional reception of signals from the first node. In some implementations, the communications manager 1020 may be configured as or otherwise support a means for transmitting, to the second node, an indication associated with a status of signal propagation via the configurable reflective surface associated with the switching.

In some implementations, the communications manager 1020 may be configured as or otherwise support a means for performing a refinement procedure associated with the reflection characteristic of the configurable reflective surface based on a detected condition satisfying a threshold.

In some implementations, to support performing the refinement procedure, the communications manager 1020 may be configured as or otherwise support a means for transmitting, to the first node and the second node, an indication of a set of parameters for the reflection characteristic of the configurable reflective surface. In some implementations, to support performing the refinement procedure, the communications manager 1020 may be configured as or otherwise support a means for cycling the reflection characteristic of the configurable reflective surface between the set of parameters for the reflection characteristic over a set of multiple training occasions. In some implementations, to support performing the refinement procedure, the communications manager 1020 may be configured as or otherwise support a means for receiving, from at least one of the first node or the second node, a message indicating a parameter of the set of parameters. In some implementations, to support performing the refinement procedure, the communications manager 1020 may be configured as or otherwise support a means for controlling the reflection characteristic of the configurable reflective surface in accordance with the indicated parameter.

In some implementations, to support receiving the message indicating the parameter of the set of parameters, the communications manager 1020 may be configured as or otherwise support a means for receiving a measurement report indicating a signal strength associated with signaling during each training occasion of the set of multiple training occasions, the indicated parameter being associated with a training occasion of the set of multiple training occasions associated with a highest indicated signal strength. In some implementations, to support receiving the message indicating the parameter of the set of parameters, the communications manager 1020 may be configured as or otherwise support a means for receiving an indication of the training occasion of the set of multiple training occasions.

In some implementations, the detected condition includes at least one of a measured signal quality associated with at least one of the communicating with the first node in accordance with the parameter for directional reception of signals from the first node or the communicating with the second node in accordance with the parameter for directional transmission of signals to the second node or an availability of multiple parameters for the reflection characteristic of the configurable reflective surface in accordance with the parameter for directional reception of signals from the first node and the parameter for directional transmission of signals to the second node.

In some implementations, the communications manager 1020 may be configured as or otherwise support a means for transmitting a discovery signal associated with the AN and the configurable reflective surface, where communicating with the first node in accordance with the parameter for directional reception of signals from the first node and communicating with the second node in accordance with the parameter for directional transmission of signals to the second node is associated with transmitting the discovery signal.

In some implementations, to support controlling the reflection characteristic of the configurable reflective surface, the communications manager 1020 may be configured as or otherwise support a means for transmitting, to an apparatus that includes the configurable reflective surface, wireless signaling associated with the controlling of the reflection characteristic of the configurable reflective surface.

In some implementations, to support controlling the reflection characteristic of the configurable reflective surface, the communications manager 1020 may be configured as or otherwise support a means for controlling the configurable reflective surface via an electronic or fiber optic coupling between the AN and the configurable reflective surface.

Additionally, or alternatively, the communications manager 1020 may support wireless communication at an AN in accordance with examples as disclosed herein. For example, the communications manager 1020 may be configured as or otherwise support a means for receiving an indication of resources for training communications via a configurable reflective surface, the resources associated with training occasions, where each training occasion includes a set of multiple sub-occasions and where each sub-occasion includes a set of multiple measurement occasions. The communications manager 1020 may be configured as or otherwise support a means for controlling, during a training occasion, the configurable reflective surface in accordance with a respective reflection parameter value of a set of multiple reflection parameter values for each measurement occasion of the set of multiple measurement occasions associated with the respective training occasion. The communications manager 1020 may be configured as or otherwise support a means for receiving, from a first node, an indication of one of the set of multiple reflection parameter values. The communications manager 1020 may be configured as or otherwise support a means for controlling, for communications between the first node and a second node, the configurable reflective surface in accordance with the indicated one of the set of multiple reflection parameter values.

In some implementations, each sub-occasion of the training occasion is associated with a corresponding reflection parameter value of the set of multiple reflection parameter values. In some implementations, receiving the indication of one of the set of multiple reflection parameter values includes receiving an indication of one of the sub-occasions from the set of multiple sub-occasions.

In some implementations, each measurement occasion of each sub-occasion of the training is associated with a corresponding reflection parameter value of the set of multiple reflection parameter values. In some implementations, receiving the indication of one of the set of multiple reflection parameter values includes receiving an indication of one of the measurement occasions from the set of multiple measurement occasions.

In some implementations, the communications manager 1020 may be configured as or otherwise support a means for receiving, after the training occasion, a request from the first node or from the second node to initiate a second training occasion. In some implementations, the communications manager 1020 may be configured as or otherwise support a means for controlling, for the second training occasion, the configurable reflective surface in accordance with a respective reflection parameter value of a subset of the set of multiple reflection parameter values for each measurement occasion of the set of multiple measurement occasions associated with the second training occasion.

Additionally, or alternatively, the communications manager 1020 may support wireless communication at a first node in accordance with examples as disclosed herein. For example, the communications manager 1020 may be configured as or otherwise support a means for receiving an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface. The communications manager 1020 may be configured as or otherwise support a means for monitoring, during a training occasion, for signaling from a second node via the configurable reflective surface in accordance with a respective parameter for directional reception at the first node for each measurement occasion of the set of multiple measurement occasions associated with the respective training occasion. The communications manager 1020 may be configured as or otherwise support a means for transmitting an indication of one of the measurement occasions from the set of multiple measurement occasions and an indication of one of the sub-occasions from the set of multiple sub-occasions.

In some implementations, the communications manager 1020 may be configured to perform various operations (such as receiving, monitoring, transmitting) using or otherwise in cooperation with the transceiver 1015, the one or more antennas 1025, or any combination thereof. Although the communications manager 1020 is illustrated as a separate component, in some implementations, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for establishing directional communications via a configurable reflective surface as described herein, or the processor 1040 and the memory 1030 may be otherwise configured to perform or support such operations.

Figure 11:
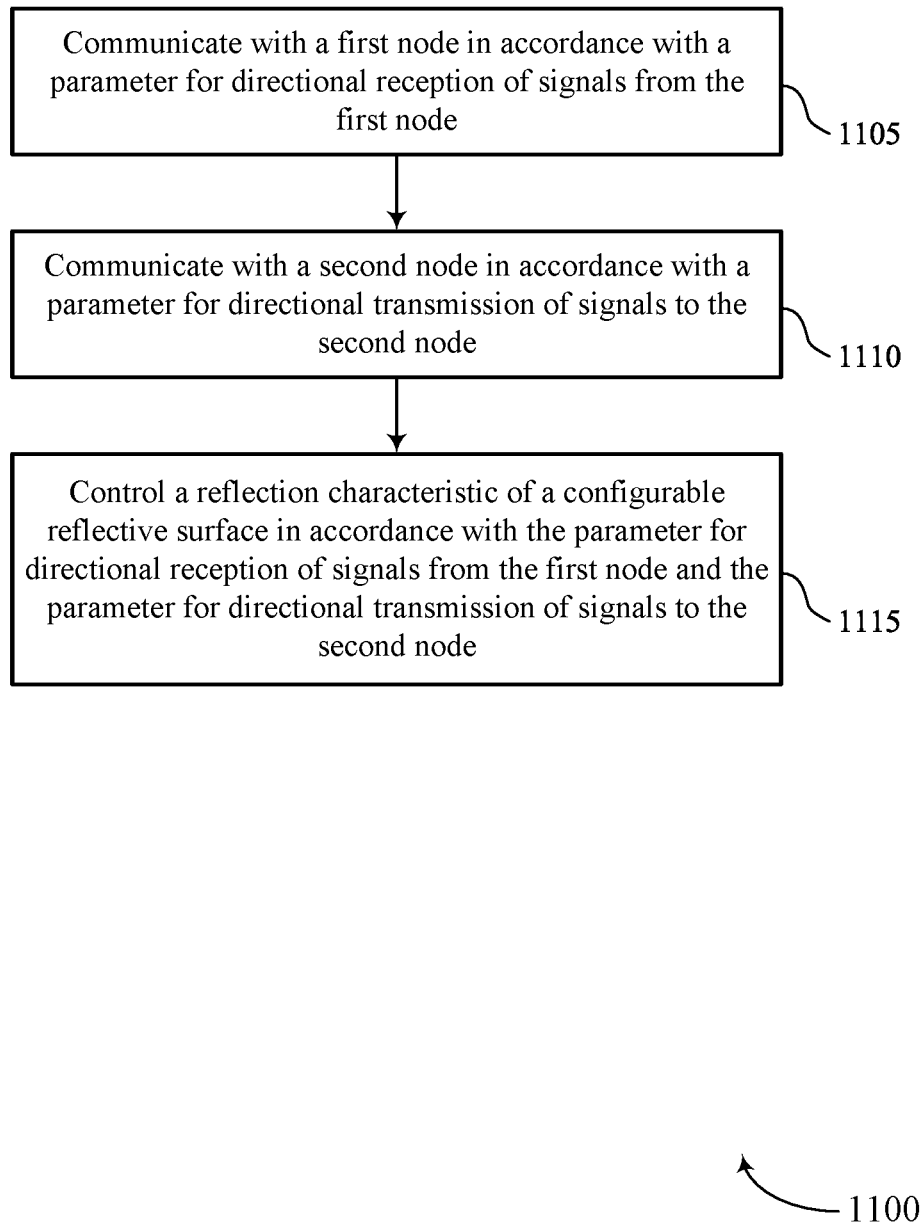
FIGS. 11-13 show flowcharts illustrating example methods that support techniques for establishing directional communications via a configurable reflective surface.

FIG. 11 shows a flowchart illustrating an example method 1100 that supports techniques for establishing directional communications via a configurable reflective surface. The operations of the method 1100 may be implemented by a UE or a BS or its components as described herein. For example, the operations of the method 1100 may be performed by a node (such as an AN), a UE 115, or one or more components of a BS 105 as described with reference to FIGS. 1-10. In some implementations, a UE or one or more components of a BS may execute a set of instructions to control the functional elements of the UE or one or more components of the BS to perform the described functions. Additionally, or alternatively, the UE or one or more components of the BS may perform aspects of the described functions using special-purpose hardware.

At 1105, the method may include communicating with a first node in accordance with a parameter for directional reception of signals from the first node. The operations of 1105 may be performed in accordance with examples as disclosed herein.

At 1110, the method may include communicating with a second node in accordance with a parameter for directional transmission of signals to the second node. The operations of 1110 may be performed in accordance with examples as disclosed herein.

At 1115, the method may include controlling a reflection characteristic of a configurable reflective surface in accordance with the parameter for directional reception of signals from the first node and the parameter for directional transmission of signals to the second node. The operations of 1115 may be performed in accordance with examples as disclosed herein.

Figure 12:
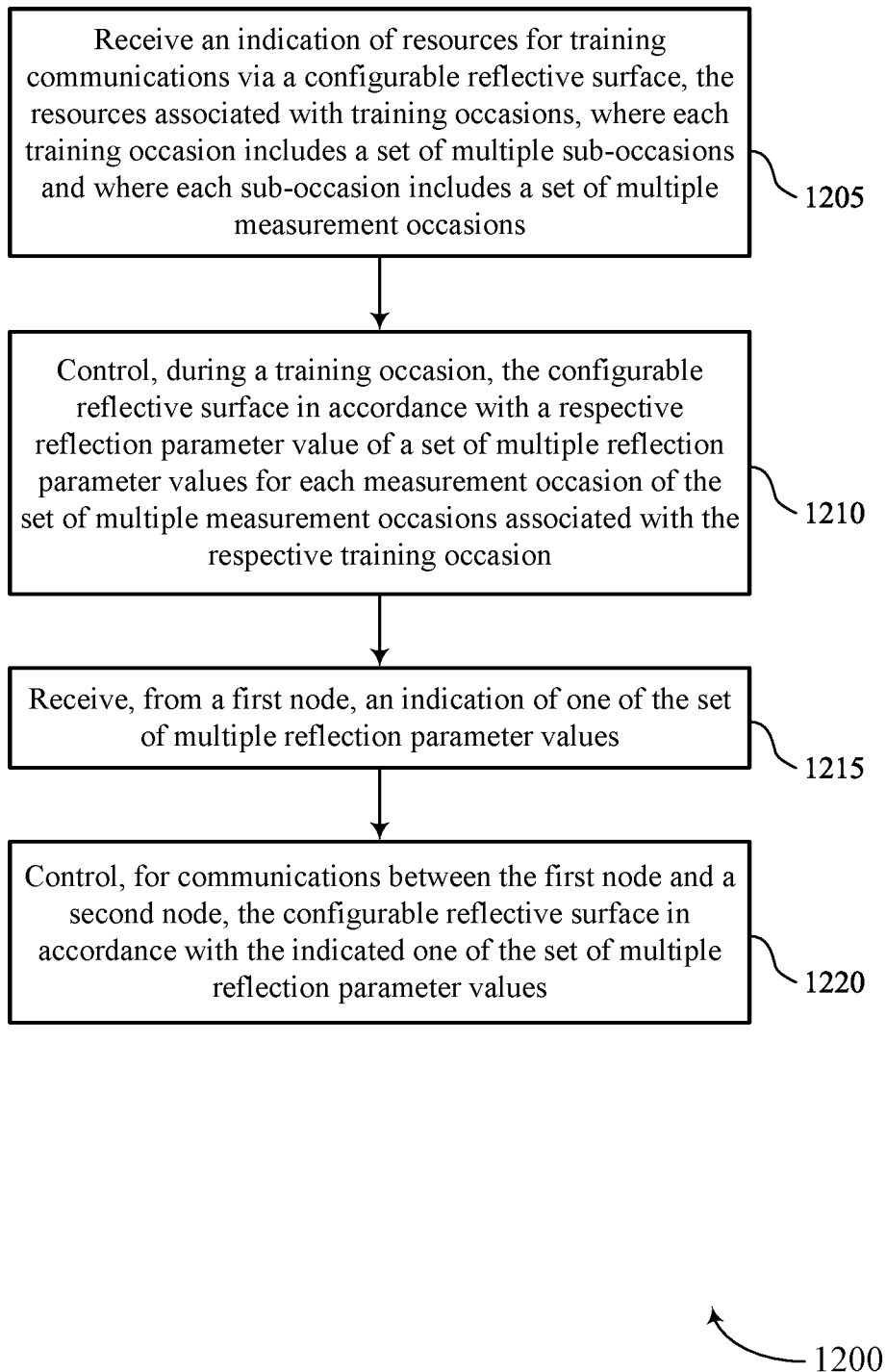

FIG. 12 shows a flowchart illustrating an example method 1200 that supports techniques for establishing directional communications via a configurable reflective surface. The operations of the method 1200 may be implemented by a UE or a BS or its components as described herein. For example, the operations of the method 1200 may be performed by a node (such as an AN), a UE 115, or one or more components of a BS 105 as described with reference to FIGS. 1-10. In some implementations, a UE or one or more components of a BS may execute a set of instructions to control the functional elements of the UE or one or more components of the BS to perform the described functions. Additionally, or alternatively, the UE or one or more components of the BS may perform aspects of the described functions using special-purpose hardware.

At 1205, the method may include receiving an indication of resources for training communications via a configurable reflective surface, the resources associated with training occasions, where each training occasion includes a set of multiple sub-occasions and where each sub-occasion includes a set of multiple measurement occasions. The operations of 1205 may be performed in accordance with examples as disclosed herein.

At 1210, the method may include controlling, during a training occasion, the configurable reflective surface in accordance with a respective reflection parameter value of a set of multiple reflection parameter values for each measurement occasion of the set of multiple measurement occasions associated with the respective training occasion. The operations of 1210 may be performed in accordance with examples as disclosed herein.

At 1215, the method may include receiving, from a first node, an indication of one of the set of multiple reflection parameter values. The operations of 1215 may be performed in accordance with examples as disclosed herein.

At 1220, the method may include controlling, for communications between the first node and a second node, the configurable reflective surface in accordance with the indicated one of the set of multiple reflection parameter values. The operations of 1220 may be performed in accordance with examples as disclosed herein.

Figure 13:
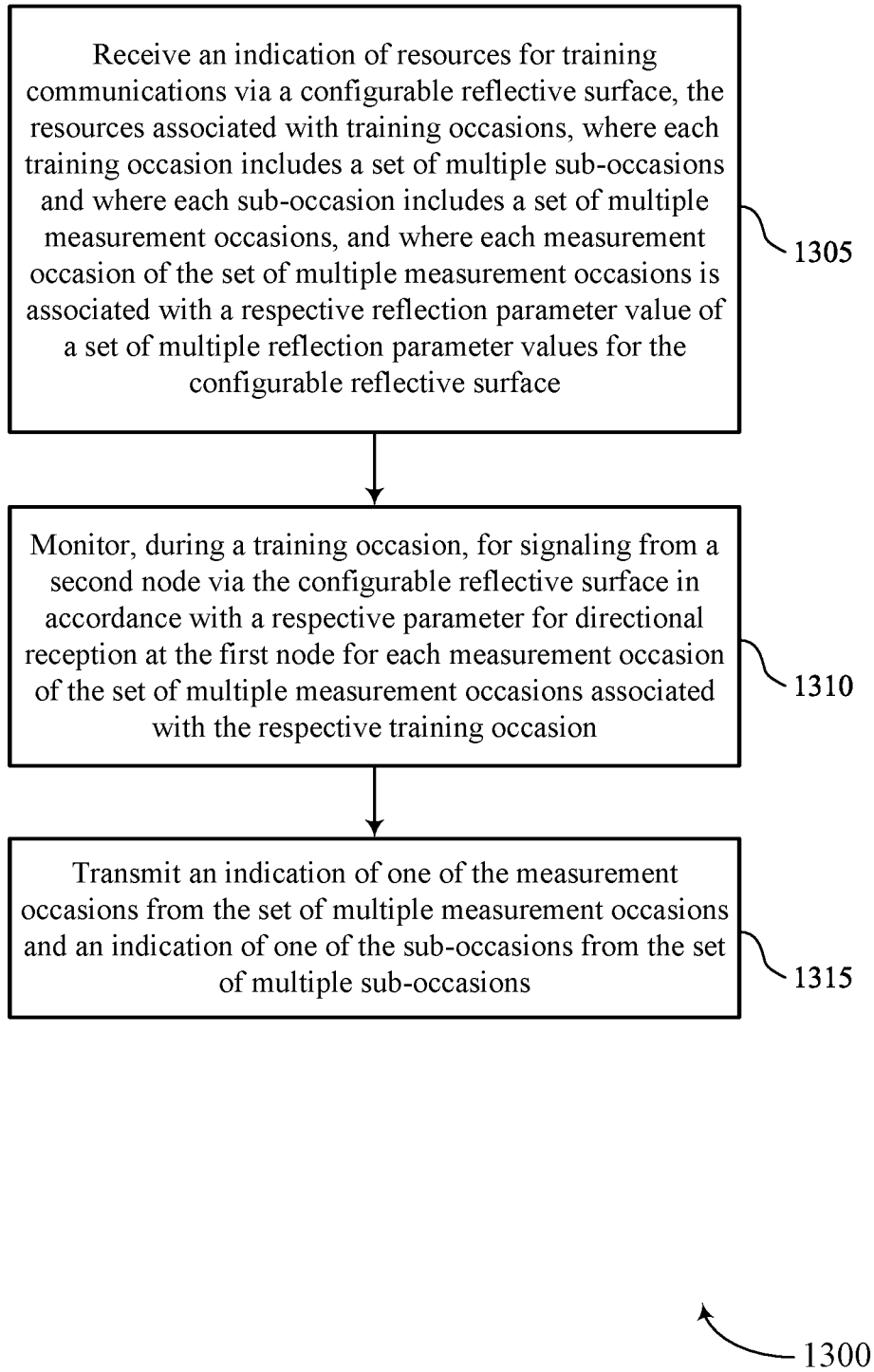

FIG. 13 shows a flowchart illustrating an example method 1300 that supports techniques for establishing directional communications via a configurable reflective surface. The operations of the method 1300 may be implemented by a UE or a BS or its components as described herein. For example, the operations of the method 1300 may be performed by a node (such as a communication node), a UE 115, or one or more components of a BS 105 as described with reference to FIGS. 1-10. In some implementations, a UE or one or more components of a BS may execute a set of instructions to control the functional elements of the UE or one or more components of the BS to perform the described functions. Additionally, or alternatively, the UE or one or more components of the BS may perform aspects of the described functions using special-purpose hardware.

At 1305, the method may include receiving an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface. The operations of 1305 may be performed in accordance with examples as disclosed herein.

At 1310, the method may include monitoring, during a training occasion, for signaling from a second node via the configurable reflective surface in accordance with a respective parameter for directional reception at the first node for each measurement occasion of the set of multiple measurement occasions associated with the respective training occasion. The operations of 1310 may be performed in accordance with examples as disclosed herein.

At 1315, the method may include transmitting an indication of one of the measurement occasions from the set of multiple measurement occasions and an indication of one of the sub-occasions from the set of multiple sub-occasions. The operations of 1315 may be performed in accordance with examples as disclosed herein.

The following provides an overview of some aspects of the present disclosure:

Aspect 1: A method for wireless communication at an AN, including: communicating with a first node in accordance with a parameter for directional reception of signals from the first node; communicating with a second node in accordance with a parameter for directional transmission of signals to the second node; and controlling a reflection characteristic of a configurable reflective surface in accordance with the parameter for directional reception of signals from the first node and the parameter for directional transmission of signals to the second node.

Aspect 2: The method of aspect 1, where controlling the reflection characteristic of the configurable reflective surface includes: controlling, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

Aspect 3: The method of any of aspects 1 or 2, where controlling the reflection characteristic of the configurable reflective surface includes: controlling, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

Aspect 4: The method of any of aspects 1-3, where controlling the reflection characteristic of the configurable reflective surface includes: selecting, from a lookup resource stored at the AN, a parameter for the reflection characteristic of the configurable reflective surface that is associated with the parameter for directional reception of signals from the first node and the parameter for directional transmission of signals to the second node; and controlling the reflection characteristic of the configurable reflective surface in accordance with the selected parameter.

Aspect 5: The method of any of aspects 1-4, further including: receiving, from the first node, an indication associated with a link establishment between the first node and the second node, where communicating with the second node in accordance with the parameter for directional transmission of signals to the second node is associated with receiving the indication.

Aspect 6: The method of any of aspects 1-5, further including: performing a beam sweeping procedure using a first RF band to establish the parameter for directional reception of signals from the first node, where communicating with the first node in accordance with the parameter for directional reception of signals from the first node is associated with performing the beam sweeping procedure.

Aspect 7: The method of aspect 6, further including: establishing an SRB with the first node using a second RF band, where performing the beam sweeping procedure using the first RF band is associated with the establishing of the SRB with the first node using the second RF band.

Aspect 8: The method of any of aspects 1-5, further including: establishing an SRB with the first node using a first RF band; and using a same parameter for directional reception as used for establishing the SRB with the first node using the first RF band to establish the parameter for directional reception of signals from the first node, where communicating with the first node in accordance with the parameter for directional reception of signals from the first node is associated with using the same parameter for directional reception.

Aspect 9: The method of any of aspects 1-8, further including: switching from communicating with the first node in accordance with the parameter for directional reception of signals from the first node to communicating with the first node in accordance with a second parameter for directional reception of signals from the first node; and controlling the reflection characteristic of the configurable reflective surface in accordance with the second parameter for directional reception of signals from the first node.

Aspect 10: The method of any of aspects 1-9, further including: switching from communicating with the second node in accordance with the parameter for directional transmission of signals to the second node to communicating with the second node in accordance with a second parameter for directional transmission of signals to the second node; and controlling the reflection characteristic of the configurable reflective surface in accordance with the second parameter for directional transmission of signals to the second node.

Aspect 11: The method of any of aspects 1-10, further including: switching from communicating with the first node in accordance with the parameter for directional reception of signals from the first node to communicating with the first node in accordance with a second parameter for directional reception of signals from the first node; and transmitting, to the second node, an indication associated with a status of signal propagation via the configurable reflective surface associated with the switching.

Aspect 12: The method of any of aspects 1-11, further including: performing a refinement procedure associated with the reflection characteristic of the configurable reflective surface based on a detected condition satisfying a threshold.

Aspect 13: The method of aspect 12, where performing the refinement procedure includes: transmitting, to the first node and the second node, an indication of a set of parameters for the reflection characteristic of the configurable reflective surface; cycling the reflection characteristic of the configurable reflective surface between the set of parameters for the reflection characteristic over a set of multiple training occasions; receiving, from at least one of the first node or the second node, a message indicating a parameter of the set of parameters; and controlling the reflection characteristic of the configurable reflective surface in accordance with the indicated parameter.

Aspect 14: The method of aspect 13, where receiving the message indicating the parameter of the set of parameters includes: receiving a measurement report indicating a signal strength associated with signaling during each training occasion of the set of multiple training occasions, the indicated parameter being associated with a training occasion of the set of multiple training occasions associated with a highest indicated signal strength; or receiving an indication of the training occasion of the set of multiple training occasions.

Aspect 15: The method of any of aspects 12-14, where the detected condition includes at least one of: a measured signal quality associated with at least one of the communicating with the first node in accordance with the parameter for directional reception of signals from the first node or the communicating with the second node in accordance with the parameter for directional transmission of signals to the second node; or an availability of multiple parameters for the reflection characteristic of the configurable reflective surface in accordance with the parameter for directional reception of signals from the first node and the parameter for directional transmission of signals to the second node.

Aspect 16: The method of any of aspects 1-15, further including: transmitting a discovery signal associated with the AN and the configurable reflective surface, where communicating with the first node in accordance with the parameter for directional reception of signals from the first node and communicating with the second node in accordance with the parameter for directional transmission of signals to the second node is associated with transmitting the discovery signal.

Aspect 17: The method of any of aspects 1-16, where controlling the reflection characteristic of the configurable reflective surface includes: transmitting, to an apparatus that includes the configurable reflective surface, wireless signaling associated with the controlling of the reflection characteristic of the configurable reflective surface.

Aspect 18: The method of any of aspects 1-16, where controlling the reflection characteristic of the configurable reflective surface includes: controlling the configurable reflective surface via an electronic or fiber optic coupling between the AN and the configurable reflective surface.

Aspect 19: A method for wireless communication at an AN, including: receiving an indication of resources for training communications via a configurable reflective surface, the resources associated with training occasions, where each training occasion includes a set of multiple sub-occasions and where each sub-occasion includes a set of multiple measurement occasions; controlling, during a training occasion, the configurable reflective surface in accordance with a respective reflection parameter value of a set of multiple reflection parameter values for each measurement occasion of the set of multiple measurement occasions associated with the respective training occasion; receiving, from a first node, an indication of one of the set of multiple reflection parameter values; and controlling, for communications between the first node and a second node, the configurable reflective surface in accordance with the indicated one of the set of multiple reflection parameter values.

Aspect 20: The method of aspect 19, where each sub-occasion of the training occasion is associated with a corresponding reflection parameter value of the set of multiple reflection parameter values, and receiving the indication of one of the set of multiple reflection parameter values includes receiving an indication of one of the sub-occasions from the set of multiple sub-occasions.

Aspect 21: The method of aspect 19, where each measurement occasion of each sub-occasion of the training is associated with a corresponding reflection parameter value of the set of multiple reflection parameter values, and receiving the indication of one of the set of multiple reflection parameter values includes receiving an indication of one of the measurement occasions from the set of multiple measurement occasions.

Aspect 22: The method of any of aspects 19-21, further including: receiving, after the training occasion, a request from the first node or from the second node to initiate a second training occasion; and controlling, for the second training occasion, the configurable reflective surface in accordance with a respective reflection parameter value of a subset of the set of multiple reflection parameter values for each measurement occasion of the set of multiple measurement occasions associated with the second training occasion.

Aspect 23: A method for wireless communication at a first node, including: receiving an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface; monitoring, during a training occasion, for signaling from a second node via the configurable reflective surface in accordance with a respective parameter for directional reception at the first node for each measurement occasion of the set of multiple measurement occasions associated with the respective training occasion; and transmitting an indication of one of the measurement occasions from the set of multiple measurement occasions and an indication of one of the sub-occasions from the set of multiple sub-occasions.

Aspect 24: An apparatus for wireless communication at an AN, including: a processor; memory coupled with the processor; and instructions stored in the memory and executable by the processor to cause the apparatus to: communicate with a first node in accordance with a parameter for directional reception of signals from the first node; communicate with a second node in accordance with a parameter for directional transmission of signals to the second node; and control a reflection characteristic of a configurable reflective surface in accordance with the parameter for directional reception of signals from the first node and the parameter for directional transmission of signals to the second node.

Aspect 25: The apparatus of aspect 24, where the instructions to control the reflection characteristic of the configurable reflective surface are executable by the processor to cause the apparatus to: control, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

Aspect 26: The apparatus of any of aspects 24 or 25, where the instructions to control the reflection characteristic of the configurable reflective surface are executable by the processor to cause the apparatus to: control, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

Aspect 27: The apparatus of any of aspects 24-26, where the instructions to control the reflection characteristic of the configurable reflective surface are executable by the processor to cause the apparatus to: select, from a lookup resource stored at the AN, a parameter for the reflection characteristic of the configurable reflective surface that is associated with the parameter for directional reception of signals from the first node and the parameter for directional transmission of signals to the second node; and control the reflection characteristic of the configurable reflective surface in accordance with the selected parameter.

Aspect 28: The apparatus of any of aspects 24-27, where the instructions are further executable by the processor to cause the apparatus to: receive, from the first node, an indication associated with a link establishment between the first node and the second node, where communicating with the second node in accordance with the parameter for directional transmission of signals to the second node is associated with receiving the indication.

Aspect 29: The apparatus of any of aspects 24-28, where the instructions are further executable by the processor to cause the apparatus to: perform a beam sweeping procedure using a first RF band to establish the parameter for directional reception of signals from the first node, where communicating with the first node in accordance with the parameter for directional reception of signals from the first node is associated with performing the beam sweeping procedure.

Aspect 30: The apparatus of aspect 29, where the instructions are further executable by the processor to cause the apparatus to: establish an SRB with the first node using a second RF band, where performing the beam sweeping procedure using the first RF band is associated with the establishing of the SRB with the first node using the second RF band.

Aspect 31: The apparatus of any of aspects 24-28, where the instructions are further executable by the processor to cause the apparatus to: establish an SRB with the first node using a first RF band; and used a same parameter for directional reception as used for establishing the SRB with the first node using the first RF band to establish the parameter for directional reception of signals from the first node, where communicating with the first node in accordance with the parameter for directional reception of signals from the first node is associated with using the same parameter for directional reception.

Aspect 32: The apparatus of any of aspects 24-31, where the instructions are further executable by the processor to cause the apparatus to: switch from communicating with the first node in accordance with the parameter for directional reception of signals from the first node to communicating with the first node in accordance with a second parameter for directional reception of signals from the first node; and control the reflection characteristic of the configurable reflective surface in accordance with the second parameter for directional reception of signals from the first node.

Aspect 33: The apparatus of any of aspects 24-32, where the instructions are further executable by the processor to cause the apparatus to: switch from communicating with the second node in accordance with the parameter for directional transmission of signals to the second node to communicating with the second node in accordance with a second parameter for directional transmission of signals to the second node; and control the reflection characteristic of the configurable reflective surface in accordance with the second parameter for directional transmission of signals to the second node.

Aspect 34: The apparatus of any of aspects 24-33, where the instructions are further executable by the processor to cause the apparatus to: switch from communicating with the first node in accordance with the parameter for directional reception of signals from the first node to communicating with the first node in accordance with a second parameter for directional reception of signals from the first node; and transmit, to the second node, an indication associated with a status of signal propagation via the configurable reflective surface associated with the switching.

Aspect 35: The apparatus of any of aspects 24-34, where the instructions are further executable by the processor to cause the apparatus to: perform a refinement procedure associated with the reflection characteristic of the configurable reflective surface based on a detected condition satisfying a threshold.

Aspect 36: The apparatus of aspect 35, where the instructions to perform the refinement procedure are executable by the processor to cause the apparatus to: transmit, to the first node and the second node, an indication of a set of parameters for the reflection characteristic of the configurable reflective surface; cycle the reflection characteristic of the configurable reflective surface between the set of parameters for the reflection characteristic over a set of multiple training occasions; receive, from at least one of the first node or the second node, a message indicating a parameter of the set of parameters; and control the reflection characteristic of the configurable reflective surface in accordance with the indicated parameter.

Aspect 37: The apparatus of aspect 36, where the instructions to receive the message indicating the parameter of the set of parameters are executable by the processor to cause the apparatus to: receive a measurement report indicating a signal strength associated with signaling during each training occasion of the set of multiple training occasions, the indicated parameter being associated with a training occasion of the set of multiple training occasions associated with a highest indicated signal strength; or receive an indication of the training occasion of the set of multiple training occasions.

Aspect 38: The apparatus of any of aspects 35-37, where the instructions to are executable by the processor to cause the apparatus to: a measured signal quality associate with at least one of the communicating with the first node in accordance with the parameter for directional reception of signals from the first node or the communicating with the second node in accordance with the parameter for directional transmission of signals to the second node; or an availability of multiple parameters for the reflection characteristic of the configurable reflective surface in accordance with the parameter for directional reception of signals from the first node and the parameter for directional transmission of signals to the second node.

Aspect 39: The apparatus of any of aspects 24-38, where the instructions are further executable by the processor to cause the apparatus to: transmit a discovery signal associated with the AN and the configurable reflective surface, where communicating with the first node in accordance with the parameter for directional reception of signals from the first node and communicating with the second node in accordance with the parameter for directional transmission of signals to the second node is associated with transmitting the discovery signal.

Aspect 40: The apparatus of any of aspects 24-39, where the instructions to control the reflection characteristic of the configurable reflective surface are executable by the processor to cause the apparatus to: transmit, to an apparatus that includes the configurable reflective surface, wireless signaling associated with the controlling of the reflection characteristic of the configurable reflective surface.

Aspect 41: The apparatus of any of aspects 24-40, where the instructions to control the reflection characteristic of the configurable reflective surface are executable by the processor to cause the apparatus to: control the configurable reflective surface via an electronic or fiber optic coupling between the AN and the configurable reflective surface.

Aspect 42: An apparatus for wireless communication at an AN, including: a processor; memory coupled with the processor; and instructions stored in the memory and executable by the processor to cause the apparatus to: receive an indication of resources for training communications via a configurable reflective surface, the resources associated with training occasions, where each training occasion includes a set of multiple sub-occasions and where each sub-occasion includes a set of multiple measurement occasions; control, during a training occasion, the configurable reflective surface in accordance with a respective reflection parameter value of a set of multiple reflection parameter values for each measurement occasion of the set of multiple measurement occasions associated with the respective training occasion; receive, from a first node, an indication of one of the set of multiple reflection parameter values; and control, for communications between the first node and a second node, the configurable reflective surface in accordance with the indicated one of the set of multiple reflection parameter values.

Aspect 43: The apparatus of aspect 42, where each sub-occasion of the training occasion is associated with a corresponding reflection parameter value of the set of multiple reflection parameter values, and receiving the indication of one of the set of multiple reflection parameter values includes receiving an indication of one of the sub-occasions from the set of multiple sub-occasions.

Aspect 44: The apparatus of aspect 42, where each measurement occasion of each sub-occasion of the training is associated with a corresponding reflection parameter value of the set of multiple reflection parameter values, and receiving the indication of one of the set of multiple reflection parameter values includes receiving an indication of one of the measurement occasions from the set of multiple measurement occasions.

Aspect 45: The apparatus of any of aspects 42-44, where the instructions are further executable by the processor to cause the apparatus to: receive, after the training occasion, a request from the first node or from the second node to initiate a second training occasion; and control, for the second training occasion, the configurable reflective surface in accordance with a respective reflection parameter value of a subset of the set of multiple reflection parameter values for each measurement occasion of the set of multiple measurement occasions associated with the second training occasion.

Aspect 46: An apparatus for wireless communication at a first node, including: a processor; memory coupled with the processor; and instructions stored in the memory and executable by the processor to cause the apparatus to: receive an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface; monitor, during a training occasion, for signaling from a second node via the configurable reflective surface in accordance with a respective parameter for directional reception at the first node for each measurement occasion of the set of multiple measurement occasions associated with the respective training occasion; and transmit an indication of one of the measurement occasions from the set of multiple measurement occasions and an indication of one of the sub-occasions from the set of multiple sub-occasions.

Aspect 47: An apparatus for wireless communication at an AN, including: means for communicating with a first node in accordance with a parameter for directional reception of signals from the first node; means for communicating with a second node in accordance with a parameter for directional transmission of signals to the second node; and means for controlling a reflection characteristic of a configurable reflective surface in accordance with the parameter for directional reception of signals from the first node and the parameter for directional transmission of signals to the second node.

Aspect 48: The apparatus of aspect 47, where the means for controlling the reflection characteristic of the configurable reflective surface include: means for controlling, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

Aspect 49: The apparatus of any of aspects 47-48, where the means for controlling the reflection characteristic of the configurable reflective surface include: means for controlling, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

Aspect 50: The apparatus of any of aspects 47-49, where the means for controlling the reflection characteristic of the configurable reflective surface include: means for selecting, from a lookup resource stored at the AN, a parameter for the reflection characteristic of the configurable reflective surface that is associated with the parameter for directional reception of signals from the first node and the parameter for directional transmission of signals to the second node; and means for controlling the reflection characteristic of the configurable reflective surface in accordance with the selected parameter.

Aspect 51: The apparatus of any of aspects 47-50, further including: means for receiving, from the first node, an indication associated with a link establishment between the first node and the second node, where communicating with the second node in accordance with the parameter for directional transmission of signals to the second node is associated with receiving the indication.

Aspect 52: The apparatus of any of aspects 47-51, further including: means for performing a beam sweeping procedure using a first RF band to establish the parameter for directional reception of signals from the first node, where communicating with the first node in accordance with the parameter for directional reception of signals from the first node is associated with performing the beam sweeping procedure.

Aspect 53: The apparatus of aspect 52, further including: means for establishing an SRB with the first node using a second RF band, where performing the beam sweeping procedure using the first RF band is associated with the establishing of the SRB with the first node using the second RF band.

Aspect 54: The apparatus of any of aspects 47-51, further including: means for establishing an SRB with the first node using a first RF band; and means for using a same parameter for directional reception as used for establishing the SRB with the first node using the first RF band to establish the parameter for directional reception of signals from the first node, where communicating with the first node in accordance with the parameter for directional reception of signals from the first node is associated with using the same parameter for directional reception.

Aspect 55: The apparatus of any of aspects 47-54, further including: means for switching from communicating with the first node in accordance with the parameter for directional reception of signals from the first node to communicating with the first node in accordance with a second parameter for directional reception of signals from the first node; and means for controlling the reflection characteristic of the configurable reflective surface in accordance with the second parameter for directional reception of signals from the first node.

Aspect 56: The apparatus of any of aspects 47-55, further including: means for switching from communicating with the second node in accordance with the parameter for directional transmission of signals to the second node to communicating with the second node in accordance with a second parameter for directional transmission of signals to the second node; and means for controlling the reflection characteristic of the configurable reflective surface in accordance with the second parameter for directional transmission of signals to the second node.

Aspect 57: The apparatus of any of aspects 47-56, further including: means for switching from communicating with the first node in accordance with the parameter for directional reception of signals from the first node to communicating with the first node in accordance with a second parameter for directional reception of signals from the first node; and means for transmitting, to the second node, an indication associated with a status of signal propagation via the configurable reflective surface associated with the switching.

Aspect 58: The apparatus of any of aspects 47-57, further including: means for performing a refinement procedure associated with the reflection characteristic of the configurable reflective surface based on a detected condition satisfying a threshold.

Aspect 59: The apparatus of aspect 58, where the means for performing the refinement procedure include: means for transmitting, to the first node and the second node, an indication of a set of parameters for the reflection characteristic of the configurable reflective surface; means for cycling the reflection characteristic of the configurable reflective surface between the set of parameters for the reflection characteristic over a set of multiple training occasions; means for receiving, from at least one of the first node or the second node, a message indicating a parameter of the set of parameters; and means for controlling the reflection characteristic of the configurable reflective surface in accordance with the indicated parameter.

Aspect 60: The apparatus of aspect 59, where the means for receiving the message indicating the parameter of the set of parameters include: means for receiving a measurement report indicating a signal strength associated with signaling during each training occasion of the set of multiple training occasions, the indicated parameter being associated with a training occasion of the set of multiple training occasions associated with a highest indicated signal strength; or means for receiving an indication of the training occasion of the set of multiple training occasions.

Aspect 61: The apparatus of any of aspects 58-60, where the means for include: means for a measured signal quality associated with at least one of the communicating with the first node in accordance with the parameter for directional reception of signals from the first node or the communicating with the second node in accordance with the parameter for directional transmission of signals to the second node; or means for an availability of multiple parameters for the reflection characteristic of the configurable reflective surface in accordance with the parameter for directional reception of signals from the first node and the parameter for directional transmission of signals to the second node.

Aspect 62: The apparatus of any of aspects 47-61, further including: means for transmitting a discovery signal associated with the AN and the configurable reflective surface, where communicating with the first node in accordance with the parameter for directional reception of signals from the first node and communicating with the second node in accordance with the parameter for directional transmission of signals to the second node is associated with transmitting the discovery signal.

Aspect 63: The apparatus of any of aspects 47-62, where the means for controlling the reflection characteristic of the configurable reflective surface include: means for transmitting, to an apparatus that includes the configurable reflective surface, wireless signaling associated with the controlling of the reflection characteristic of the configurable reflective surface.

Aspect 64: The apparatus of any of aspects 47-63, where the means for controlling the reflection characteristic of the configurable reflective surface include: means for controlling the configurable reflective surface via an electronic or fiber optic coupling between the AN and the configurable reflective surface.

Aspect 65: An apparatus for wireless communication at an AN, including: means for receiving an indication of resources for training communications via a configurable reflective surface, the resources associated with training occasions, where each training occasion includes a set of multiple sub-occasions and where each sub-occasion includes a set of multiple measurement occasions; means for controlling, during a training occasion, the configurable reflective surface in accordance with a respective reflection parameter value of a set of multiple reflection parameter values for each measurement occasion of the set of multiple measurement occasions associated with the respective training occasion; means for receiving, from a first node, an indication of one of the set of multiple reflection parameter values; and means for controlling, for communications between the first node and a second node, the configurable reflective surface in accordance with the indicated one of the set of multiple reflection parameter values.

Aspect 66: The apparatus of aspect 65, where each sub-occasion of the training occasion is associated with a corresponding reflection parameter value of the set of multiple reflection parameter values, and receiving the indication of one of the set of multiple reflection parameter values includes receiving an indication of one of the sub-occasions from the set of multiple sub-occasions.

Aspect 67: The apparatus of aspect 65, where each measurement occasion of each sub-occasion of the training is associated with a corresponding reflection parameter value of the set of multiple reflection parameter values, and receiving the indication of one of the set of multiple reflection parameter values includes receiving an indication of one of the measurement occasions from the set of multiple measurement occasions.

Aspect 68: The apparatus of any of aspects 65-67, further including: means for receiving, after the training occasion, a request from the first node or from the second node to initiate a second training occasion; and means for controlling, for the second training occasion, the configurable reflective surface in accordance with a respective reflection parameter value of a subset of the set of multiple reflection parameter values for each measurement occasion of the set of multiple measurement occasions associated with the second training occasion.

Aspect 69: An apparatus for wireless communication at a first node, including: means for receiving an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface; means for monitoring, during a training occasion, for signaling from a second node via the configurable reflective surface in accordance with a respective parameter for directional reception at the first node for each measurement occasion of the set of multiple measurement occasions associated with the respective training occasion; and means for transmitting an indication of one of the measurement occasions from the set of multiple measurement occasions and an indication of one of the sub-occasions from the set of multiple sub-occasions.

Aspect 70: A non-transitory computer-readable medium storing code for wireless communication at an AN, the code including instructions executable by a processor to: communicate with a first node in accordance with a parameter for directional reception of signals from the first node; communicate with a second node in accordance with a parameter for directional transmission of signals to the second node; and control a reflection characteristic of a configurable reflective surface in accordance with the parameter for directional reception of signals from the first node and the parameter for directional transmission of signals to the second node.

Aspect 71: The non-transitory computer-readable medium of aspect 70, where the instructions to control the reflection characteristic of the configurable reflective surface are executable by the processor to: control, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

Aspect 72: The non-transitory computer-readable medium of any of aspects 70-71, where the instructions to control the reflection characteristic of the configurable reflective surface are executable by the processor to: control, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

Aspect 73: The non-transitory computer-readable medium of any of aspects 70-72, where the instructions to control the reflection characteristic of the configurable reflective surface are executable by the processor to: select, from a lookup resource stored at the AN, a parameter for the reflection characteristic of the configurable reflective surface that is associated with the parameter for directional reception of signals from the first node and the parameter for directional transmission of signals to the second node; and control the reflection characteristic of the configurable reflective surface in accordance with the selected parameter.

Aspect 74: The non-transitory computer-readable medium of any of aspects 70-73, where the instructions are further executable by the processor to: receive, from the first node, an indication associated with a link establishment between the first node and the second node, where communicating with the second node in accordance with the parameter for directional transmission of signals to the second node is associated with receiving the indication.

Aspect 75: The non-transitory computer-readable medium of any of aspects 70-74, where the instructions are further executable by the processor to: perform a beam sweeping procedure using a first RF band to establish the parameter for directional reception of signals from the first node, where communicating with the first node in accordance with the parameter for directional reception of signals from the first node is associated with performing the beam sweeping procedure.

Aspect 76: The non-transitory computer-readable medium of aspect 75, where the instructions are further executable by the processor to: establish an SRB with the first node using a second RF band, where performing the beam sweeping procedure using the first RF band is associated with the establishing of the SRB with the first node using the second RF band.

Aspect 77: The non-transitory computer-readable medium of any of aspects 70-74, where the instructions are further executable by the processor to: establish an SRB with the first node using a first RF band; and used a same parameter for directional reception as used for establishing the SRB with the first node using the first RF band to establish the parameter for directional reception of signals from the first node, where communicating with the first node in accordance with the parameter for directional reception of signals from the first node is associated with using the same parameter for directional reception.

Aspect 78: The non-transitory computer-readable medium of any of aspects 70-77, where the instructions are further executable by the processor to: switch from communicating with the first node in accordance with the parameter for directional reception of signals from the first node to communicating with the first node in accordance with a second parameter for directional reception of signals from the first node; and control the reflection characteristic of the configurable reflective surface in accordance with the second parameter for directional reception of signals from the first node.

Aspect 79: The non-transitory computer-readable medium of any of aspects 70-78, where the instructions are further executable by the processor to: switch from communicating with the second node in accordance with the parameter for directional transmission of signals to the second node to communicating with the second node in accordance with a second parameter for directional transmission of signals to the second node; and control the reflection characteristic of the configurable reflective surface in accordance with the second parameter for directional transmission of signals to the second node.

Aspect 80: The non-transitory computer-readable medium of any of aspects 70-79, where the instructions are further executable by the processor to: switch from communicating with the first node in accordance with the parameter for directional reception of signals from the first node to communicating with the first node in accordance with a second parameter for directional reception of signals from the first node; and transmit, to the second node, an indication associated with a status of signal propagation via the configurable reflective surface associated with the switching.

Aspect 81: The non-transitory computer-readable medium of any of aspects 70-80, where the instructions are further executable by the processor to: perform a refinement procedure associated with the reflection characteristic of the configurable reflective surface based on a detected condition satisfying a threshold.

Aspect 82: The non-transitory computer-readable medium of aspect 81, where the instructions to perform the refinement procedure are executable by the processor to: transmit, to the first node and the second node, an indication of a set of parameters for the reflection characteristic of the configurable reflective surface; cycle the reflection characteristic of the configurable reflective surface between the set of parameters for the reflection characteristic over a set of multiple training occasions; receive, from at least one of the first node or the second node, a message indicating a parameter of the set of parameters; and control the reflection characteristic of the configurable reflective surface in accordance with the indicated parameter.

Aspect 83: The non-transitory computer-readable medium of aspect 82, where the instructions to receive the message indicating the parameter of the set of parameters are executable by the processor to: receive a measurement report indicating a signal strength associated with signaling during each training occasion of the set of multiple training occasions, the indicated parameter being associated with a training occasion of the set of multiple training occasions associated with a highest indicated signal strength; or receive an indication of the training occasion of the set of multiple training occasions.

Aspect 84: The non-transitory computer-readable medium of any of aspects 81-83, where the instructions to are executable by the processor to: a measured signal quality associate with at least one of the communicating with the first node in accordance with the parameter for directional reception of signals from the first node or the communicating with the second node in accordance with the parameter for directional transmission of signals to the second node; or an availability of multiple parameters for the reflection characteristic of the configurable reflective surface in accordance with the parameter for directional reception of signals from the first node and the parameter for directional transmission of signals to the second node.

Aspect 85: The non-transitory computer-readable medium of any of aspects 70-84, where the instructions are further executable by the processor to: transmit a discovery signal associated with the AN and the configurable reflective surface, where communicating with the first node in accordance with the parameter for directional reception of signals from the first node and communicating with the second node in accordance with the parameter for directional transmission of signals to the second node is associated with transmitting the discovery signal.

Aspect 86: The non-transitory computer-readable medium of any of aspects 70-85, where the instructions to control the reflection characteristic of the configurable reflective surface are executable by the processor to: transmit, to an apparatus that includes the configurable reflective surface, wireless signaling associated with the controlling of the reflection characteristic of the configurable reflective surface.

Aspect 87: The non-transitory computer-readable medium of any of aspects 70-86, where the instructions to control the reflection characteristic of the configurable reflective surface are executable by the processor to: control the configurable reflective surface via an electronic or fiber optic coupling between the AN and the configurable reflective surface.

Aspect 88: A non-transitory computer-readable medium storing code for wireless communication at an AN, the code including instructions executable by a processor to: receive an indication of resources for training communications via a configurable reflective surface, the resources associated with training occasions, where each training occasion includes a set of multiple sub-occasions and where each sub-occasion includes a set of multiple measurement occasions; control, during a training occasion, the configurable reflective surface in accordance with a respective reflection parameter value of a set of multiple reflection parameter values for each measurement occasion of the set of multiple measurement occasions associated with the respective training occasion; receive, from a first node, an indication of one of the set of multiple reflection parameter values; and control, for communications between the first node and a second node, the configurable reflective surface in accordance with the indicated one of the set of multiple reflection parameter values.

Aspect 89: The non-transitory computer-readable medium of aspect 88, where each sub-occasion of the training occasion is associated with a corresponding reflection parameter value of the set of multiple reflection parameter values, and receiving the indication of one of the set of multiple reflection parameter values includes receiving an indication of one of the sub-occasions from the set of multiple sub-occasions.

Aspect 90: The non-transitory computer-readable medium of aspect 88, where each measurement occasion of each sub-occasion of the training is associated with a corresponding reflection parameter value of the set of multiple reflection parameter values, and receiving the indication of one of the set of multiple reflection parameter values includes receiving an indication of one of the measurement occasions from the set of multiple measurement occasions.

Aspect 91: The non-transitory computer-readable medium of any of aspects 88-90, where the instructions are further executable by the processor to: receive, after the training occasion, a request from the first node or from the second node to initiate a second training occasion; and control, for the second training occasion, the configurable reflective surface in accordance with a respective reflection parameter value of a subset of the set of multiple reflection parameter values for each measurement occasion of the set of multiple measurement occasions associated with the second training occasion.

Aspect 92: A non-transitory computer-readable medium storing code for wireless communication at a first node, the code including instructions executable by a processor to: receive an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface; monitor, during a training occasion, for signaling from a second node via the configurable reflective surface in accordance with a respective parameter for directional reception at the first node for each measurement occasion of the set of multiple measurement occasions associated with the respective training occasion; and transmit an indication of one of the measurement occasions from the set of multiple measurement occasions and an indication of one of the sub-occasions from the set of multiple sub-occasions.

Aspect 93: An apparatus for wireless communication at an AN, including: a first interface configured to: communicate with a first node in accordance with a parameter for directional reception of signals from the first node; and communicate with a second node in accordance with a parameter for directional transmission of signals to the second node; and the first interface, a second interface, or a processing system, or any combination thereof, configured to: control a reflection characteristic of a configurable reflective surface in accordance with the parameter for directional reception of signals from the first node and the parameter for directional transmission of signals to the second node.

Aspect 94: The apparatus of aspect 93, where, to control the reflection characteristic of the configurable reflective surface, the first interface, the second interface, or the processor, or any combination thereof, is configured to: controlling, for transmissions from the first node to the second node, the reflection characteristic of the configurable reflective surface in accordance with a direction of incident signaling that is associated with the parameter for directional reception of signals from the first node and in accordance with a direction of reflected signaling that is associated with the parameter for directional transmission of signals to the second node.

Aspect 95: The apparatus of any of aspects 93 or 94, where, to control the reflection characteristic of the configurable reflective surface, the first interface, the second interface, or the processor, or any combination thereof, is configured to: controlling, for transmissions from the second node to the first node, the reflection characteristic of the configurable reflective surface in accordance with a direction of incident signaling that is associated with the parameter for directional transmission of signals to the second node and with a direction of reflected signaling that is associated with the parameter for directional reception of signals from the first node.

Aspect 96: The apparatus of any of aspects 93-95, where, to control the reflection characteristic of the configurable reflective surface, the first interface, the second interface, or the processor, or any combination thereof, is configured to: selecting, from a lookup resource stored at the AN, a parameter for the reflection characteristic of the configurable reflective surface that is associated with the parameter for directional reception of signals from the first node and the parameter for directional transmission of signals to the second node; and controlling the reflection characteristic of the configurable reflective surface in accordance with the selected parameter.

Aspect 97: The apparatus of any of aspects 93-96, where the first interface or the second interface is further configured to: obtain, from the first node, an indication associated with a link establishment between the first node and the second node, where communicating with the second node in accordance with the parameter for directional transmission of signals to the second node is associated with obtaining the indication.

Aspect 98: The apparatus of any of aspects 93-97, where the first interface or the second interface is further configured to: perform a beam sweeping procedure using a first RF band to establish the parameter for directional reception of signals from the first node, where communicating with the first node in accordance with the parameter for directional reception of signals from the first node is associated with performing the beam sweeping procedure.

Aspect 99: The apparatus of aspect 98, where the first interface or the second interface is further configured to: establish an SRB with the first node using a second RF band, where performing the beam sweeping procedure using the first RF band is associated with the establishing of the SRB with the first node using the second RF band.

Aspect 100: The apparatus of any of aspects 93-97, where the first interface or the second interface is further configured to: establish an SRB with the first node using a first RF band; and use a same parameter for directional reception as used for establishing the SRB with the first node using the first RF band to establish the parameter for directional reception of signals from the first node, where communicating with the first node in accordance with the parameter for directional reception of signals from the first node is associated with using the same parameter for directional reception.

Aspect 101: The apparatus of any of aspects 93-100, where: the first interface or the second interface is further configured to: switch from communicating with the first node in accordance with the parameter for directional reception of signals from the first node to communicating with the first node in accordance with a second parameter for directional reception of signals from the first node; and the first interface, the second interface, or the processing system, or any combination thereof, is further configured to: control the reflection characteristic of the configurable reflective surface in accordance with the second parameter for directional reception of signals from the first node.

Aspect 102: The apparatus of any of aspects 93-101, where: the first interface or the second interface is further configured to: switch from communicating with the second node in accordance with the parameter for directional transmission of signals to the second node to communicating with the second node in accordance with a second parameter for directional transmission of signals to the second node; and the first interface, the second interface, or the processing system, or any combination thereof, is further configured to: control the reflection characteristic of the configurable reflective surface in accordance with the second parameter for directional transmission of signals to the second node.

Aspect 103: The apparatus of any of aspects 93-102, where the first interface or the second interface is further configured to: switch from communicating with the first node in accordance with the parameter for directional reception of signals from the first node to communicating with the first node in accordance with a second parameter for directional reception of signals from the first node; and output, to the second node, an indication associated with a status of signal propagation via the configurable reflective surface associated with the switching.

Aspect 104: The apparatus of any of aspects 93-103, where the first interface, the second interface, or the processing system, or any combination thereof, is further configured to: perform a refinement procedure associated with the reflection characteristic of the configurable reflective surface based on a detected condition satisfying a threshold.

Aspect 105: The apparatus of aspect 104, where, to perform the refinement procedure, the first interface, the second interface, or the processing system, or any combination thereof, is further configured to: output, to the first node and the second node, an indication of a set of parameters for the reflection characteristic of the configurable reflective surface; cycle the reflection characteristic of the configurable reflective surface between the set of parameters for the reflection characteristic over a set of multiple training occasions; obtain, from at least one of the first node or the second node, a message indicating a parameter of the set of parameters; and control the reflection characteristic of the configurable reflective surface in accordance with the indicated parameter.

Aspect 106: The apparatus of aspect 105, where, to obtain the message indicating the parameter of the set of parameters, the first interface, the second interface, or the processing system, or any combination thereof, is further configured to: obtaining a measurement report indicating a signal strength associated with signaling during each training occasion of the set of multiple training occasions, the indicated parameter being associated with a training occasion of the set of multiple training occasions associated with a highest indicated signal strength; or obtaining an indication of the training occasion of the set of multiple training occasions.

Aspect 107: The apparatus of any of aspects 104-106, where the detected condition includes at least one of: a measured signal quality associate with at least one of the communicating with the first node in accordance with the parameter for directional reception of signals from the first node or the communicating with the second node in accordance with the parameter for directional transmission of signals to the second node; or an availability of multiple parameters for the reflection characteristic of the configurable reflective surface in accordance with the parameter for directional reception of signals from the first node and the parameter for directional transmission of signals to the second node.

Aspect 108: The apparatus of any of aspects 93-107, where the first interface or the second interface is further configured to: output a discovery signal associated with the AN and the configurable reflective surface, where communicating with the first node in accordance with the parameter for directional reception of signals from the first node and communicating with the second node in accordance with the parameter for directional transmission of signals to the second node is associated with outputting the discovery signal.

Aspect 109: The apparatus of any of aspects 93-108, where, to control the reflection characteristic of the configurable reflective surface, the first interface, the second interface, or the processor, or any combination thereof, is configured to: output, to an apparatus that includes the configurable reflective surface, wireless signaling associated with the controlling of the reflection characteristic of the configurable reflective surface.

Aspect 110: The apparatus of any of aspects 93-109, where, to control the reflection characteristic of the configurable reflective surface, the first interface, the second interface, or the processor, or any combination thereof, is configured to: controlling the configurable reflective surface via an electronic or fiber optic coupling between the AN and the configurable reflective surface.

Aspect 111: An apparatus for wireless communication at an AN, including: a first interface configured to: obtain an indication of resources for training communications via a configurable reflective surface, the resources associated with training occasions, where each training occasion includes a set of multiple sub-occasions and where each sub-occasion includes a set of multiple measurement occasions; the first interface, a second interface, or a processing system, or any combination thereof, configured to: control, during a training occasion, the configurable reflective surface in accordance with a respective reflection parameter value of a set of multiple reflection parameter values for each measurement occasion of the set of multiple measurement occasions associated with the respective training occasion; the first interface or the second interface configured to: obtain, from a first node, an indication of one of the set of multiple reflection parameter values; and the first interface, the second interface, or the processing system, or any combination thereof, configured to: control, for communications between the first node and a second node, the configurable reflective surface in accordance with the indicated one of the set of multiple reflection parameter values.

Aspect 112: The apparatus of aspect 111, where each sub-occasion of the training occasion is associated with a corresponding reflection parameter value of the set of multiple reflection parameter values, and obtaining the indication of one of the set of multiple reflection parameter values includes obtaining an indication of one of the sub-occasions from the set of multiple sub-occasions.

Aspect 113: The apparatus of aspect 111, where each measurement occasion of each sub-occasion of the training is associated with a corresponding reflection parameter value of the set of multiple reflection parameter values, and obtaining the indication of one of the set of multiple reflection parameter values includes obtaining an indication of one of the measurement occasions from the set of multiple measurement occasions.

Aspect 114: The apparatus of any of aspects 111-113, where: the first interface or the second interface is further configured to: obtain, after the training occasion, a request from the first node or from the second node to initiate a second training occasion; and the first interface, the second interface, or the processing system, or any combination thereof, is further configured to: control, for the second training occasion, the configurable reflective surface in accordance with a respective reflection parameter value of a subset of the set of multiple reflection parameter values for each measurement occasion of the set of multiple measurement occasions associated with the second training occasion.

Aspect 115: An apparatus for wireless communication at a first node, including: a first interface configured to: obtain an indication of resources for training communications via a configurable reflective surface, the resources associated with training occasions, where each training occasion includes a set of multiple sub-occasions and where each sub-occasion includes a set of multiple measurement occasions, and where each measurement occasion of the set of multiple measurement occasions is associated with a respective reflection parameter value of a set of multiple reflection parameter values for the configurable reflective surface; monitor, during a training occasion, for signaling from a second node via the configurable reflective surface in accordance with a respective parameter for directional reception at the first node for each measurement occasion of the set of multiple measurement occasions associated with the respective training occasion; and the first interface or a second interface configured to: output an indication of one of the measurement occasions from the set of multiple measurement occasions and an indication of one of the sub-occasions from the set of multiple sub-occasions.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An assisting node (AN), comprising:
a processing system that includes one or more processors and one or more memories coupled with the one or more processors, the processing system configured to cause the AN to:
establish a signaling radio bearer (SRB) with a first node using a first radio frequency (RF) band;
communicate with the first node in accordance with:
a parameter for directional reception of signals that indicates a first direction of incident signaling from the first node, and
the established SRB;
communicate with a second node in accordance with a parameter for directional transmission of signals that indicates a second direction of reflected signaling to the second node; and
control a reflection characteristic of a configurable reflective surface in accordance with the parameter for directional reception of signals and the parameter for directional transmission of signals.

2. The AN of claim 1, wherein, to control the reflection characteristic of the configurable reflective surface, the processing system is further configured to cause the AN to:
control, for transmissions from the first node to the second node, the reflection characteristic of the configurable reflective surface in accordance with the first direction of incident signaling from the first node and in accordance with the second direction of reflected signaling to the second node.

3. The AN of claim 1, wherein, to control the reflection characteristic of the configurable reflective surface, the processing system is further configured to cause the AN to:
control, for transmissions from the second node to the first node, a second reflection characteristic of the configurable reflective surface in accordance with a third direction of incident signaling from the second node and with a fourth direction of reflected signaling to the first node.

4. The AN of claim 1, wherein, to control the reflection characteristic of the configurable reflective surface, the processing system is further configured to cause the AN to:
select, from a lookup resource stored at the AN, a parameter for the reflection characteristic of the configurable reflective surface that is associated with the parameter for directional reception of signals and the parameter for directional transmission of signals; and
control the reflection characteristic of the configurable reflective surface in accordance with the selected parameter.

5. The AN of claim 1, wherein the processing system is further configured to cause the AN to:
obtain, from the first node, an indication associated with a link establishment between the first node and the second node, wherein communicating with the second node in accordance with the parameter for directional transmission of signals is associated with obtaining the indication.

6. The AN of claim 1, wherein the processing system is further configured to cause the AN to:
perform a beam sweeping procedure using a second RF band to establish the parameter for directional reception of signals, wherein communicating with the first node is associated with performing the beam sweeping procedure.

7. The AN of claim 6, wherein performing the beam sweeping procedure using the second RF band is associated with the establishing of the SRB with the first node using the first RF band.

8. The AN of claim 1, wherein the processing system is further configured to cause the AN to:
use a same parameter for directional reception as used for establishing the SRB with the first node using the first RF band to establish the parameter for directional reception of signals, wherein communicating with the first node is associated with using the same parameter for directional reception.

9. The AN of claim 1, wherein the processing system is further configured to cause the AN to:

switch from communicating with the first node in accordance with the parameter for directional reception of signals to communicating with the first node in accordance with a second parameter for directional reception of signals that indicates a third direction of incident signaling from the first node; and control the reflection characteristic of the configurable reflective surface in accordance with the second parameter for directional reception of signals.

10. The AN of claim 1, wherein the processing system is further configured to cause the AN to:

switch from communicating with the second node in accordance with the parameter for directional transmission of signals to communicating with the second node in accordance with a second parameter for directional transmission of signals that indicates a fourth direction of reflected signaling to the second node; and control the reflection characteristic of the configurable reflective surface in accordance with the second parameter for directional transmission of signals.

11. The AN of claim 1, wherein the processing system is further configured to cause the AN to:

switch from communicating with the first node in accordance with the parameter for directional reception of signals to communicating with the first node in accordance with a second parameter for directional reception of signals that indicates a third direction of incident signaling from the first node; and output, to the second node, an indication associated with a status of signal propagation via the configurable reflective surface associated with the switching.

12. The AN of claim 1, wherein the processing system is further configured to cause the AN to:

perform a refinement procedure associated with the reflection characteristic of the configurable reflective surface in accordance with a detected condition satisfying a threshold.

13. The AN of claim 12, wherein, to perform the refinement procedure, the processing system is further configured to cause the AN to:

output, to the first node and the second node, an indication of a set of parameters for the reflection characteristic of the configurable reflective surface;

cycle the reflection characteristic of the configurable reflective surface between the set of parameters for the reflection characteristic over a plurality of training occasions;

obtain, from at least one of the first node or the second node, a message indicating a parameter of the set of parameters; and control the reflection characteristic of the configurable reflective surface in accordance with the indicated parameter.

14. The AN of claim 13, wherein, to obtain the message indicating the parameter of the set of parameters, the processing system is further configured to cause the AN to:

obtain a measurement report indicating a signal strength associated with signaling during each training occasion of the plurality of training occasions, the indicated parameter being associated with a training occasion of the plurality of training occasions associated with a highest indicated signal strength; or obtain an indication of the training occasion of the plurality of training occasions.

15. The AN of claim 12, wherein the detected condition comprises at least one of:

a measured signal quality associated with at least one of the communicating with the first node in accordance with the parameter for directional reception of signals or the communicating with the second node in accordance with the parameter for directional transmission of signals; or an availability of multiple parameters for the reflection characteristic of the configurable reflective surface in accordance with the parameter for directional reception of signals and the parameter for directional transmission of signals.

16. A method for wireless communication at an assisting node (AN), comprising:

establishing a signaling radio bearer (SRB) with a first node using a first radio frequency (RF) band;

communicating with the first node in accordance with:
a parameter for directional reception of signals that indicates a first direction of incident signaling from the first node, and
the established SRB;

communicating with a second node in accordance with a parameter for directional transmission of signals that indicates a second direction of reflected signaling to the second node; and controlling a reflection characteristic of a configurable reflective surface in accordance with the parameter for directional reception of signals and the parameter for directional transmission of signals.

17. The method of claim 16, wherein controlling the reflection characteristic of the configurable reflective surface comprises:

controlling, for transmissions from the first node to the second node, the reflection characteristic of the configurable reflective surface in accordance with the first direction of incident signaling from the first node and in accordance with the second direction of reflected signaling to the second node.

18. The method of claim 16, wherein controlling the reflection characteristic of the configurable reflective surface comprises:

controlling, for transmissions from the second node to the first node, a second reflection characteristic of the configurable reflective surface in accordance with a third direction of incident signaling from the second node and with a fourth direction of reflected signaling to the first node.

19. The method of claim 16, wherein controlling the reflection characteristic of the configurable reflective surface comprises:

selecting, from a lookup resource stored at the AN, a parameter for the reflection characteristic of the configurable reflective surface that is associated with the parameter for directional reception of signals and the parameter for directional transmission of signals; and controlling the reflection characteristic of the configurable reflective surface in accordance with the selected parameter.

20. The method of claim 16, further comprising:

receiving, from the first node, an indication associated with a link establishment between the first node and the second node, wherein communicating with the second node in accordance with the parameter for directional transmission of signals is associated with receiving the indication.

21. The method of claim 16, further comprising:

performing a beam sweeping procedure using a second RF band to establish the parameter for directional reception of signals, wherein performing the beam sweeping procedure using the second RF band is associated with the establishing of the SRB with the first node using the first RF band, and wherein communicating with the first node is associated with performing the beam sweeping procedure.

22. The method of claim 16, further comprising:
using a same parameter for directional reception as used for establishing the SRB with the first node using the first RF band to establish the parameter for directional reception of signals, wherein communicating with the first node is associated with using the same parameter for directional reception.

23. The method of claim 16, further comprising:
switching from communicating with the first node in accordance with the parameter for directional reception of signals to communicating with the first node in accordance with a second parameter for directional reception of signals that indicates a third direction of incident signaling from the first node; and
controlling the reflection characteristic of the configurable reflective surface in accordance with the second parameter for directional reception of signals.

24. The method of claim 16, further comprising:
switching from communicating with the second node in accordance with the parameter for directional transmission of signals to communicating with the second node in accordance with a second parameter for directional transmission of signals that indicates a fourth direction of reflected signaling to the second node; and
controlling the reflection characteristic of the configurable reflective surface in accordance with the second parameter for directional transmission of signals.

25. The method of claim 16, further comprising:
switching from communicating with the first node in accordance with the parameter for directional reception of signals to communicating with the first node in accordance with a second parameter for directional reception of signals that indicates a third direction of incident signaling from the first node; and
transmitting, to the second node, an indication associated with a status of signal propagation via the configurable reflective surface associated with the switching.

26. The method of claim 16, further comprising:
performing a refinement procedure associated with the reflection characteristic of the configurable reflective surface in accordance with a detected condition satisfying a threshold.

27. The method of claim 26, wherein performing the refinement procedure comprises:
transmitting, to the first node and the second node, an indication of a set of parameters for the reflection characteristic of the configurable reflective surface;
cycling the reflection characteristic of the configurable reflective surface between the set of parameters for the reflection characteristic over a set of multiple training occasions;
receiving, from at least one of the first node or the second node, a message indicating a parameter of the set of parameters; and
controlling the reflection characteristic of the configurable reflective surface in accordance with the indicated parameter.

28. The method of claim 27, wherein receiving the message indicating the parameter of the set of parameters comprises:
receiving a measurement report indicating a signal strength associated with signaling during each training occasion of the set of multiple training occasions, the indicated parameter being associated with a training occasion of the set of multiple training occasions associated with a highest indicated signal strength; or
receiving an indication of the training occasion of the set of multiple training occasions.

29. The method of claim 26, wherein the detected condition comprises at least one of:
a measured signal quality associated with at least one of the communicating with the first node in accordance with the parameter for directional reception of signals or the communicating with the second node in accordance with the parameter for directional transmission of signals; or
an availability of multiple parameters for the reflection characteristic of the configurable reflective surface in accordance with the parameter for directional reception of signals and the parameter for directional transmission of signals.

30. The method of claim 16, further comprising:
transmitting a discovery signal associated with the AN and the configurable reflective surface, wherein communicating with the first node in accordance with the parameter for directional reception of signals and communicating with the second node in accordance with the parameter for directional transmission of signals is associated with transmitting the discovery signal.

* * * * *